US008136292B2

(12) United States Patent
Morgan

(10) Patent No.: US 8,136,292 B2
(45) Date of Patent: Mar. 20, 2012

(54) DEVICE AND METHOD FOR SUPPORT OF SHEET MATERIAL

(76) Inventor: Wayne Steven Morgan, Soquel, CA (US)

( * ) Notice: Subject to any disclaimer, the term of this patent is extended or adjusted under 35 U.S.C. 154(b) by 149 days.

(21) Appl. No.: 12/660,054

(22) Filed: Feb. 19, 2010

(65) Prior Publication Data

US 2011/0113683 A1   May 19, 2011

Related U.S. Application Data

(63) Continuation-in-part of application No. 12/590,750, filed on Nov. 13, 2009.

(51) Int. Cl.
 *A01G 17/06* (2006.01)
(52) U.S. Cl. .............................................. 47/47; 52/155
(58) Field of Classification Search ................ 47/44–47, 47/22.1, 31, 20.1, 70; 52/155
See application file for complete search history.

(56) References Cited

U.S. PATENT DOCUMENTS

| 202,179 | A | | 4/1878 | Lennon |
|---|---|---|---|---|
| 645,372 | A | | 3/1900 | Paldi |
| 1,153,380 | A | | 9/1915 | Fussel |
| 1,263,132 | A | | 4/1918 | Sharpe |
| 2,125,204 | A | | 7/1938 | Shrewsbury |
| 3,004,366 | A | | 10/1961 | Jaspert |
| 4,301,618 | A | * | 11/1981 | August ............................. 47/46 |
| 5,752,341 | A | * | 5/1998 | Goldfarb ........................... 47/78 |
| 5,930,948 | A | * | 8/1999 | Daniel ........................... 47/23.1 |
| 6,014,837 | A | | 1/2000 | Morgan |
| 6,088,953 | A | | 7/2000 | Morgan |
| 7,705,277 | B2 | * | 4/2010 | Noble et al. ............... 250/203.4 |
| 2006/0236620 | A1 | | 10/2006 | Lacrosse |
| 2007/0062109 | A1 | | 3/2007 | Jolley |
| 2008/0271388 | A1 | | 11/2008 | Bayly et al. |

FOREIGN PATENT DOCUMENTS

GB        458514      12/1936

* cited by examiner

*Primary Examiner* — Kristen C Hayes
(74) *Attorney, Agent, or Firm* — Patrick Reilly; Colin Fowler

(57) ABSTRACT

A method and device for supporting a sheet of material is provided optionally for plant support and/or protection. A fencing device includes a rigid post and two or more flexible arms. A shading material, or a protective barrier material, such as a wire mesh, a plastic netting or a deer netting material, or a solar energy collection panel may be attached to distal ends of the flexible arms and may extend for seven feet or more from a ground plane to a top height of flexible arms above the ground plane. Flags may extend vertically above the barrier material to further discourage intrusion by animals. Horizontal lines may be extended from a plurality of fencing posts to even further discourage intrusion by animals and/or to support the barrier material. A trellising device may be coupled with and above another trellising device to provide layers of shading and plant support.

20 Claims, 21 Drawing Sheets

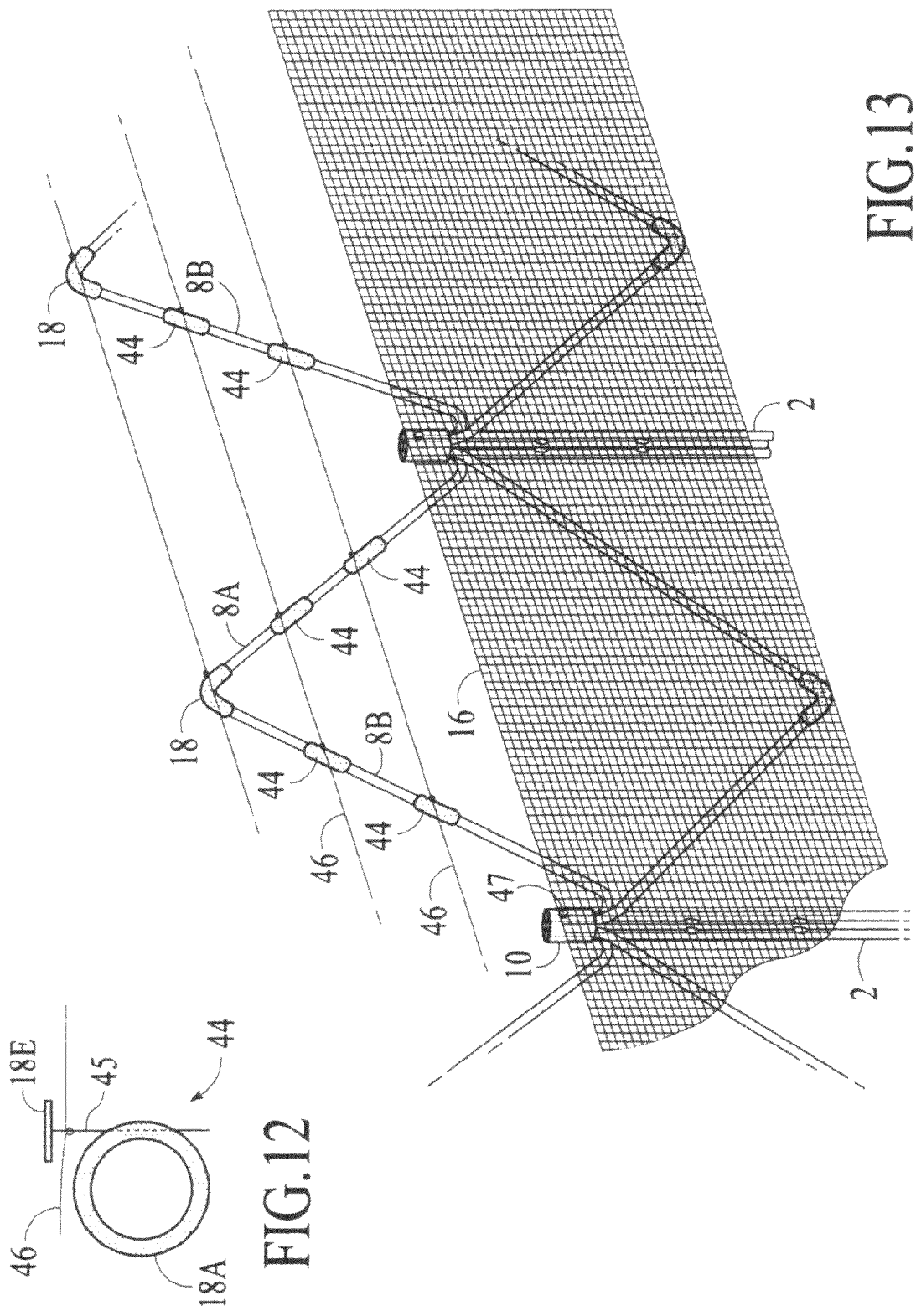

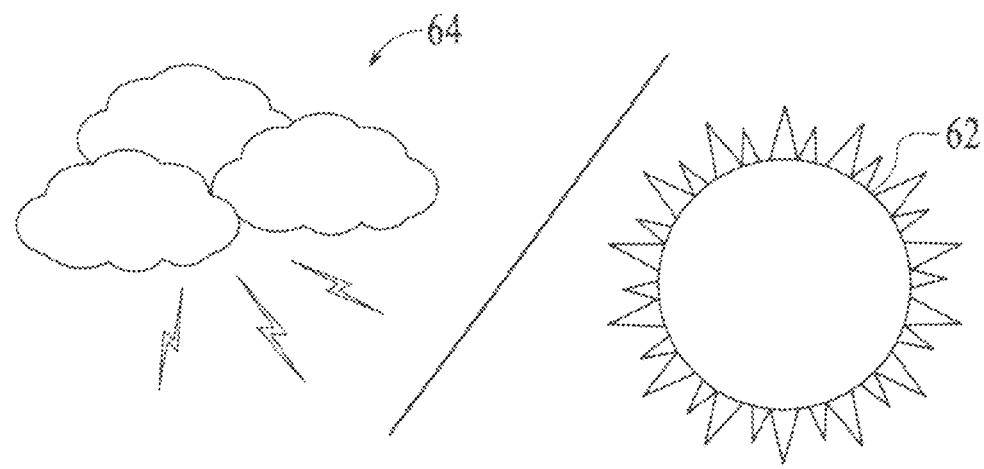
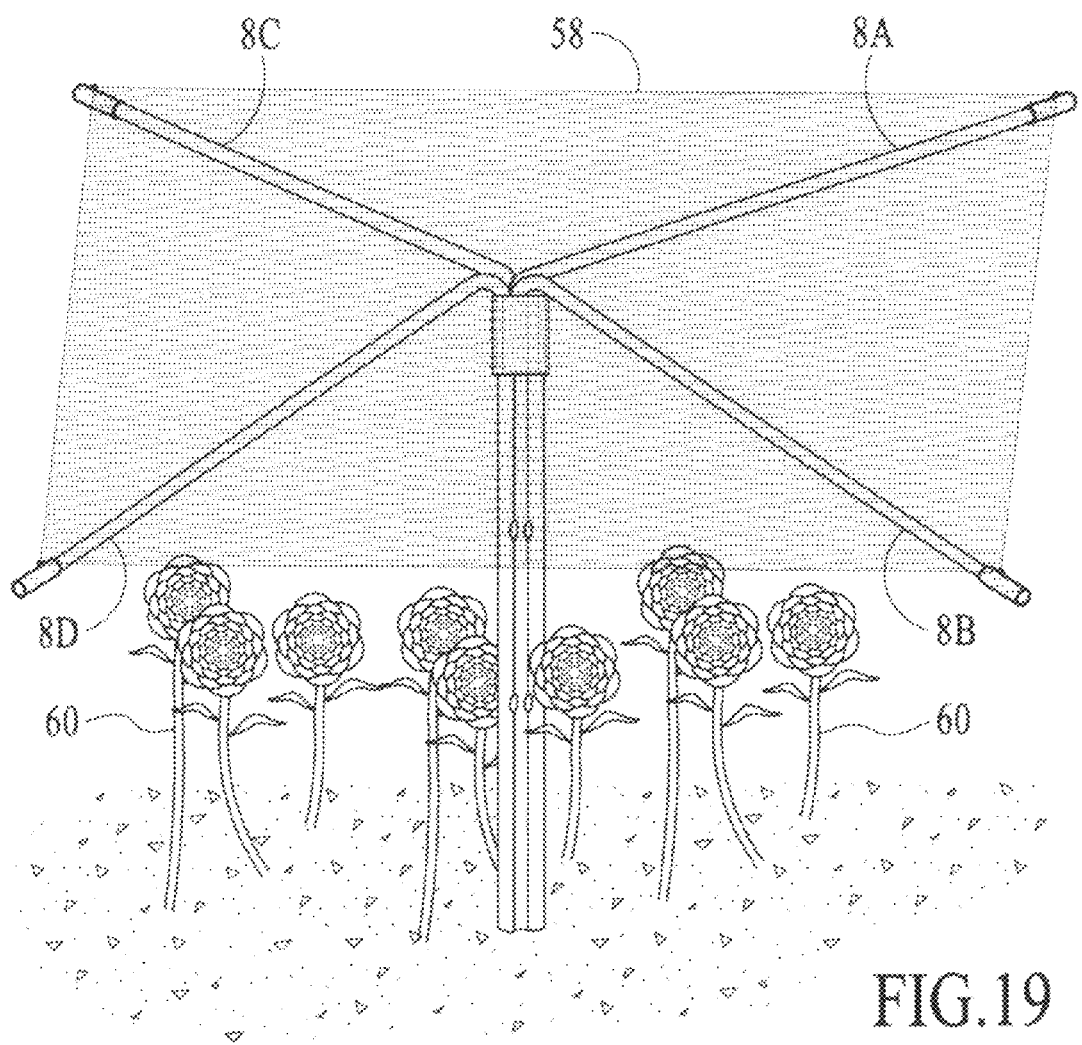
FIG.19

DEVICE AND METHOD FOR SUPPORT OF SHEET MATERIAL

CO-PENDING US NONPROVISIONAL PATENT APPLICATION

The present patent application is a Continuation-in-Part of the U.S. Nonprovisional patent application Ser. No. 12/590, 750 titled DEVICE FOR SUPPORTING A PLANT, FENCE OR OBJECT filed on Nov. 13, 2009 by inventor Wayne Morgan. This co-pending U.S. Nonprovisional patent application Ser. No. 12/590,750 is incorporated in its entirety and for all purposes. The present patent application claims benefit of the priority date of Nov. 13, 2009 of the co-pending U.S. Nonprovisional patent application Ser. No. 12/590,750.

FIELD OF THE INVENTION

The present invention relates to the field of frameworks that support sheet material and/or support and protect plants and structures from weather, animals and intruders. The method of the present invention more particularly relates to the emplacement and support of sheet material, to include trellises, netting, fence material, solar energy collection panels, and barrier material.

BACKGROUND OF THE INVENTION

Deployable structures, such as frameworks, that support and maintain sheets of material for the purposes of protection and support of plants, trellising plants, or solar energy collection have a wide range of applications in agricultural, rural and public safety sectors.

In one exemplary area of need for support structures, free roaming herbivores routinely damage plants and agricultural properties in their quest to reach edible plants. In particular, wild deer annually wreak hundreds of millions of dollars in damage to landscaping and gardens by eating and trampling plants. Deer also consume significant amounts of agricultural products. It is not unusual for an adult male deer to eat over five pounds of food per day. This rate of consumption can result in serious economic degradation of the yield of an agricultural property. In addition, deer can severely and permanently damage prairies and wooded area and even cause an extinction of certain plant species within their grazing range.

SBI, a market research firm headquartered in Rockville, Md., estimated in their publication entitled *The U.S. Market for Fencing* that the year 2005 United States domestic fencing market was over three billion dollars. This estimate included products comprising metal, vinyl and wood fencing. The *U.S. Market for Fencing* further specified factors affecting the purchase of fences and fencing material for the purpose of plant protection from deer to include disposable income, the home remodeling market, and consumer interest in home improvement and home decor.

While the market for deer barriers and barrier material measures in the billions of dollars annually, the willingness and ability of many consumers to erect deer fences is closely related to the purchase price, ease of installation and durability of deer barrier products and components. The prior art fails to offer solutions that protect plants damage and areas from intrusion by deer while optimally reducing costs of materials acquisition and increasing ease of barrier installation.

In another area of need, it is sometimes desirable to deploy sun-shading materials and protective sheets that protect plants and seedlings from sun damage and/or from exposure to inclement weather conditions. Yet the prior art fails to provide support structures that optimally enable the positioning of sun-shading materials and protective sheets above plants and seedlings over a wide range of plant growth bed or site conditions.

In yet another area of need, solar energy collection fabrics and panels are becoming increasingly available at financially attractive price points for use by consumers in a wide variety of geography and ground conditions. Yet the prior art fails to provide support structures that optimally enable the support of solar energy collection devices over exposed earth or broken ground.

There is therefore a long-felt need to provide improved methods and devices for trellising plants, supporting and protecting plants and for reducing damage by animals to sheet materials, such as solar energy collection fabric or plant protection materials.

SUMMARY OF THE INVENTION

This and other objects of the present invention are made obvious in light of this disclosure, wherein a framework is provided that includes a post coupled with at least two flexible arms. The flexible arms are coupled to the post proximal to a striking end of the post, wherein the striking end is located distally from a plurality of tines of the post. The plurality of tines form a ground end of the post. The striking end is positioned to enable a user to deliver force to the post and thereby drive the plurality of tines into a resistive medium, such as a ground surface or soil. The flexible arms may alternatively be attached to the post by means of welding, pressure fitting or other suitable coupling means known in the art.

A sheet material, such as a barrier material, a wire mesh, a plastic netting or a deer netting material, may be attached to the flexible arms and may extend for seven feet or more from a ground plane to a top height of flexible arms above the ground plane. A rod may be positioned at a bottom edge of the barrier material and positioned and coupled with the barrier material, e.g., interweaved within the lines of a netting of the barrier material, to weigh the barrier material toward the ground surface. An attachment tool, such as a garden staple, may be applied to hold the rods in position relative to the ground surface, whereby the barrier material is further secured to the ground surface.

The barrier material may optionally be a netting and/or be permeable to air and permit airflow through the barrier material. Certain barrier material, such as wire mesh, a plastic netting or a deer netting, may be coupled with the framework to form a trellis to support a plant or plants.

Alternatively or additionally, a solar energy collection panel or fabric may coupled to and supported by the flexible arms. Further alternatively or additionally, a plant shading material may coupled to and supported by the flexible arms. Even further alternatively or additionally, a material suitable to protect a plant or seedling from weather conditions may coupled to and supported by the flexible arms.

The post may include one or more separate elongate elements, such as one or more metallic rebar lengths. Two or more tines of separate elongate elements may form an anchor section of the rigid post, wherein the elongate elements are rigidly attached to maintain a substantively parallel orientation with a same elongate axis. The tines may be configured to splay away from the elongate axis when each tine of the elongate elements is forced into the ground or other resistive medium.

One or more flexible arms may reconfigurable to extend away from the striking end of the post within a range from zero degrees to 180 degrees from an elongate axis of the elongate post. Each arm may extend from less than one foot to more than six feet from the post. The flexible arms are preferably no longer than the linear post length. One or more flexible arms may alternatively or additionally be made of metallic rebar or other suitable material known in the art.

In an alternate embodiment of the method of the present invention, a plurality of devices may be coupled to protect one or more plants or an area. The plurality of devices may include couplers that join flexible arms of different devices whereby the joined arms may support a barrier material such as a deer netting. Two neighboring devices may be attached by applying couplers to each of two flexible arms of each devices. One or more couplers may be a tubing sized to form a friction fit around each end of two separate flexible device arms.

The barrier material may further comprise a flexible linear element, such as a cord, that extends above the posts of the devices and holds a netting or other sheet of material above the device posts. In yet another configuration, one or more appendages may extend up from the post to hold the linear support element in place. The barrier material may alternatively or additionally positioned above one or more fencing devices, wherein the flexible arms may extend upwards from the ground surface and be outfitted with support features that hold the barrier material up and away from one or more plants. The flexible support feature may be a Styrofoam™ ball or other suitable shaped support feature.

The foregoing and other objects, features and advantages will be apparent from the following description of aspects of the present invention as illustrated in the accompanying drawings.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 202,179 (Inventor: Lennon, S. N.; Issued on Apr. 9, 1818) titled "Improvement in fence-posts"; U.S. Pat. No. 1,153,380 (Inventor: Fussell, J. E.; issued on Sep. 14, 1915) titled "Fence-post"; U.S. Pat. No. 1,263,132 (Inventor: Sharpe, G. C.; Issued on Apr. 16, 1918); U.S. Pat. No. 6,088,953 (Inventor: Morgan, W; Issued on Jul. 18, 2000) titled "Collapsible protective plant cover"; U.S. Pat. No. 6,014,837 (Inventor, Morgan, W.; Issued on Jan. 18, 2000) titled "Adaptable plant protector"; U.S. Pat. No. 7,377,020 (Inventors: Bating, et al.; Issued on May 27, 2008) titled "Fence post bracing system"; U.S. Patent Application Publication Serial No. 20060236620 (Inventor: LaCrosse, W.; Published on Oct. 26, 2006) titled "Ground anchor"; U.S. Patent Application Publication Serial No. 20070062109 (Inventor: Jolley, W. B.; Published on Mar. 22, 2007) titled "Permanent underground staking system ad apparatus for vines and weakly rooted trees"; U.S. Patent Application Publication Serial No. 20080271388 (Inventors: Bayly, et al.; Published on Nov. 6, 2008) titled "Anchoring stake"; and U.S. Patent Application Publication No. 20060243340 (Inventors: Wheeler, et al.; Published on Nov. 2, 2006) titled "Apparatus and method for attaching fencing material".

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of various aspects of the present invention may be better understood with reference to the accompanying specification, wherein:

FIG. 12 is a side view of an alternate configuration of the tubular coupler of FIG. 8 and FIG. 9;

FIG. 13 is a perspective view of an alternate configuration of the fencing devices and barrier material of FIG. 1 through FIG. 7;

FIG. 19 is a perspective side view of the fencing device of FIG. 1 through FIG. 7, FIG. 10, FIG. 11, and FIG. 15 through FIG. 18, wherein the flexible arms are positioned to orient a shading material in a horizontal position to protect plants from the sun or exposure to inclement weather;

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Methods recited herein may be carried out in any order of the recited events which is logically possible, as well as the recited order of events.

Figure 1:
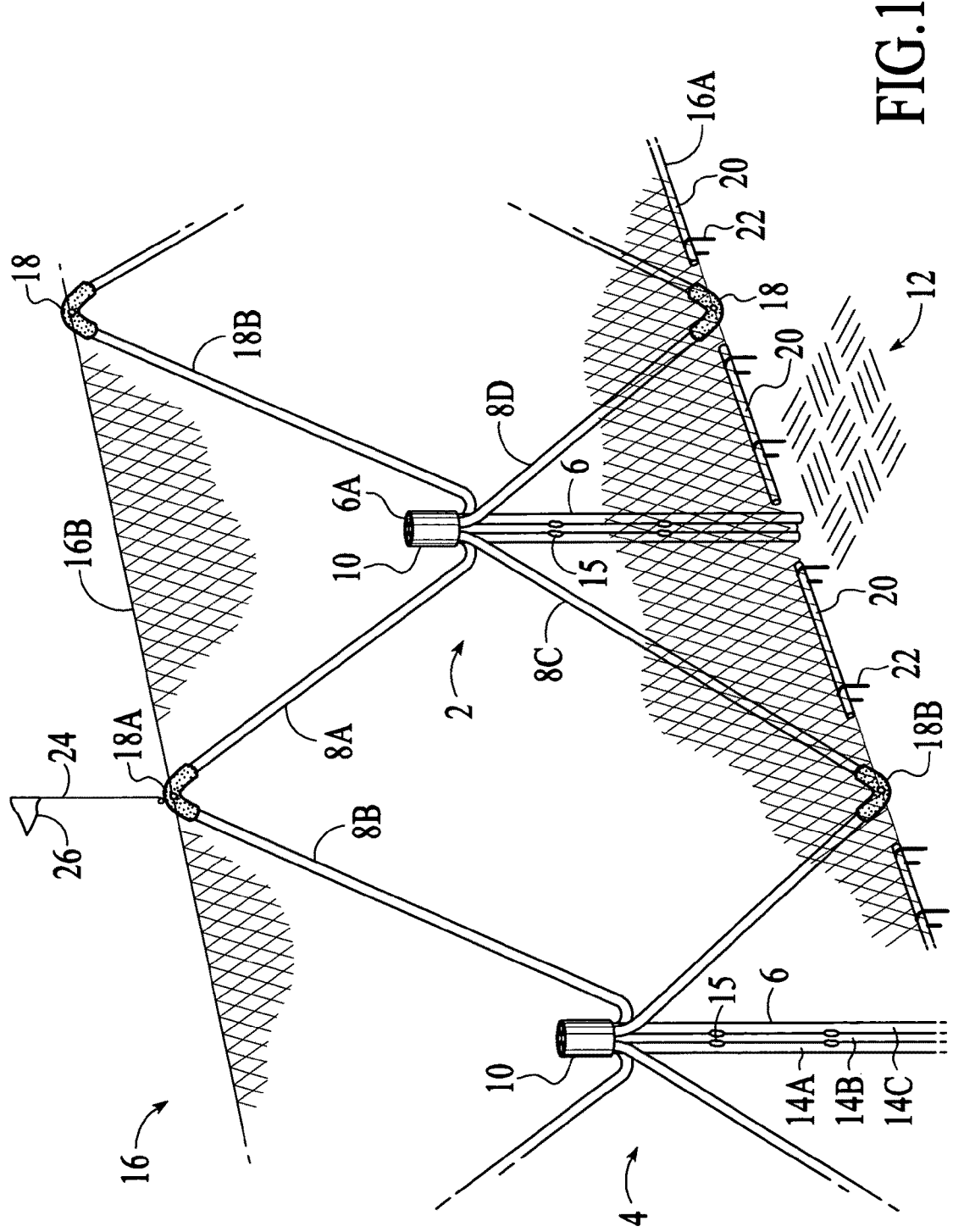
FIG. 1 is an illustration of a plurality of frameworks, or "fencing devices", holding a barrier material in place.

Referring now to FIG. 1, FIG. 1 illustrates a partial view of a plurality of frameworks 2 and 4 (or "fencing devices" 2 and 4) that are coupled together. A first fencing device 2 includes a rigid post 6 from which four flexible arms 8A-8D extend. The first fencing device 2 presents two flexible support arms 8A and 8B extending up from a collar 10 and two additional flexible support arms 8C and 8D extending from the collar 10 and downwards toward a ground surface 12. The rigid post 6 is formed of at least two elongate elements 14A-14B, and preferably three elongate elements 14A-14C. Each elongate element 14A-14C may be a length of rigid material or metal, for example, steel or metallic rebar having a 0.0375 inch cross-sectional diameter, or other suitable material known in the art.

The flexible arms 8A-8D are coupled to the rigid post 6 proximal to a striking end 6A of the rigid post 6, wherein the striking end 6A is located distally from the ground surface 12. Each flexible arm 8A-8D may be a length of metal or plastic, for example, a steel or metallic rebar having a 0.025 inch cross-sectional diameter, or other suitable material known in the art.

The striking end 6A is positioned to enable a user to deliver force toward the ground surface 12 along a central elongate axis A of the rigid post 6 and thereby partially drive the rigid post 6 a resistive medium, such as a ground surface or soil. The flexible arms 8A-8D may be attached to the rigid post 6 within the collar 10 by means of welding to the collar 10, pressure fitting of the collar 10 or other suitable coupling means known in the art. The collar may be or comprise aluminum, steel, or other suitable binding and optionally weldable or formable material known in the art.

One or more flexible arms 8A-8D may reconfigurable to extend away from the striking end 6A or collar 10 of the rigid post 6 within a range from zero degrees to 180 degrees from the elongate axis A. Each arm 8A-8D may extend from less than one foot to more than six feet from the rigid post 6. The flexible arms 8A-8D are preferably no longer than the height of the rigid post 6 along the central elongate axis A.

One or more exemplary elongate elements 14A-14C of the rigid post 6 may each comprise an individual steel reinforcing bar, known as a rebar in the art, wherein each rebar preferably presents a length in the range from 0.5 foot to twelve feet and a cross-sectional diameter preferably in the range of from 0.25 inch to 2.0 inches. Each exemplary elongate element 14A-14C preferably presents an individual length in the range from one foot to four feet and an individual cross-sectional diameter preferably in the range of from 0.25 inch to 0.75 inch. The exemplary elongate elements 14A-14C most preferably have equal lengths along the elongate axis A. It is understood that certain alternate preferred embodiments of one or more elongate elements 14A-14C may comprise a length of number three U.S. imperial bar size rebar having a nominal diameter of 0.375 inch. It is further understood that certain alternate preferred embodiments of one or more elongate elements 14A-14C may comprise a length of metric size number ten rebar having a nominal diameter of 9.525 millimeters. The elongate elements 14A-14C each preferably exhibit a yield strength preferably in the range starting from 250 Newtons per square millimeter of area and extending to 500 Newtons per square millimeter of area. Alternatively or additionally, one or more first elongate elements 14A-14C may comprise a continuous length of (a.) American Society for Testing and Materials (hereinafter, "ASTM") A 615 Deformed and plain carbon-steel bars; (b.) ASTM A 706

Low-alloy steel deformed and plain bars; (c.) ASTM A 955 Deformed and plain stainless-steel bars; and/or (d.) ASTM A 996 Rail-steel and axle-steel deformed bars. The elongate elements 14A-14C are coupled together by welds 15 to form the rigid post 6.

Alternatively or additionally, one or more elongate elements 14A-14C may be or comprise metal, a metal alloy, a solid metal material such as steel or aluminum, and/or a suitably rigid but malleable nonmetallic material known in the art. In certain still alternate embodiments of the present invention, one or more elongate elements 14A-14C may be shaped as a hollow tube, or alternatively partially hollowed in some fraction of total length.

One or more of the flexible support arms 8A-8D may be or comprise an organic plastic material, a non-organic plastic material, a metal such as aluminum, steel or iron, and/or a metal alloy. In one exemplary preferred embodiment of the present invention, one or more of the flexible support arms 8A-8D may comprise a length of steel, aluminum or iron rebar having a nominal diameter of 0.250 inch.

Figure 2:
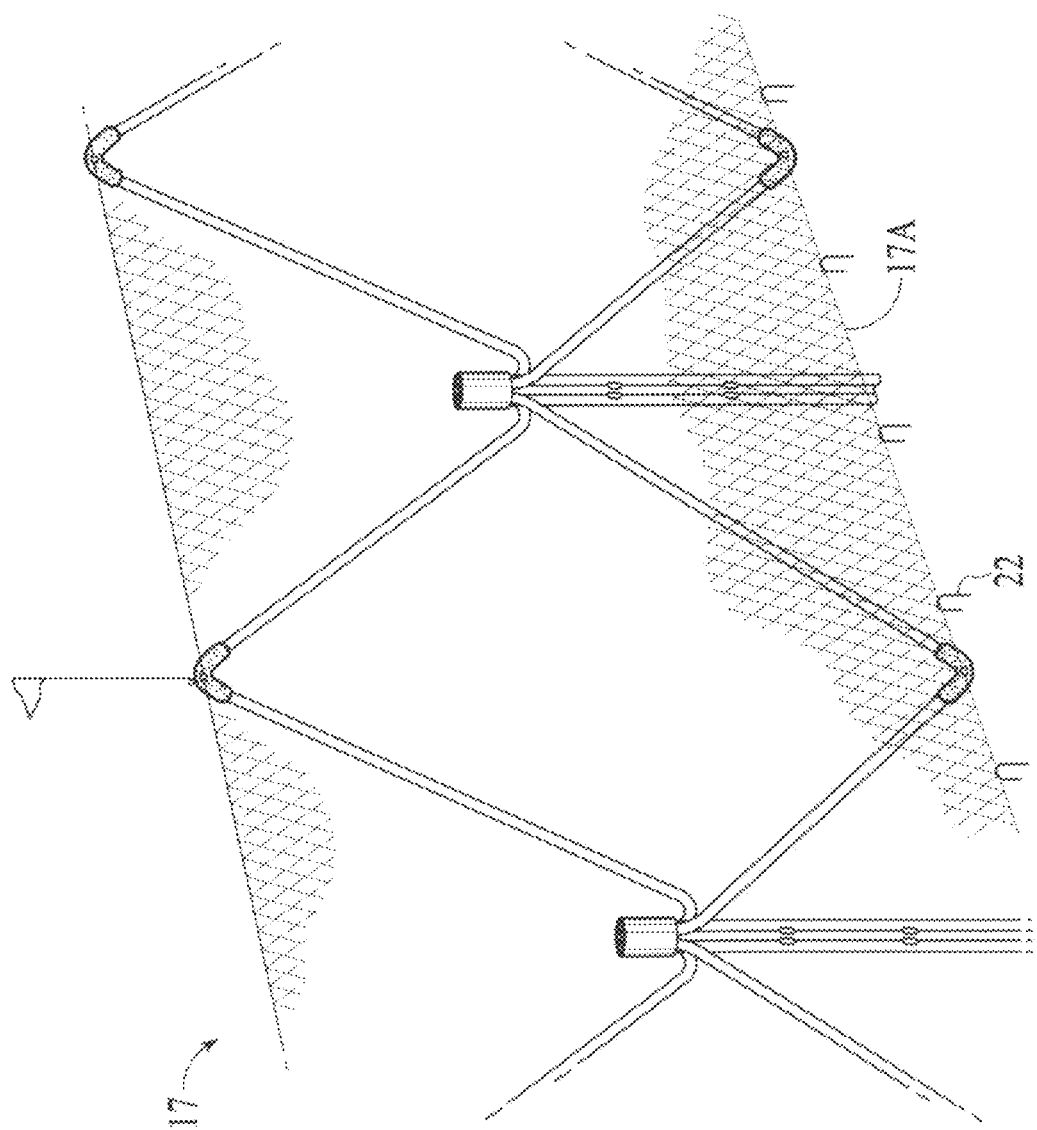
FIG. 2 is an illustration of the plurality of fencing devices holding the barrier material in place of FIG. 2, wherein the rods of FIG. 1 are not deployed along the ground side of the barrier material.

An exemplary barrier material 16 comprising netting 17 (as shown in FIG. 2) is coupled to a plurality of tubular couplers 18 and rods 20. The tubular couplers 18 additionally join pairs of flexible arms 8A-8D, wherein each tubular coupler 18 joins two separate arms 8A-8D from separate fencing devices. For example, a first tubular coupler 18A joins a first arm 8A from the first fencing device 2 and a second arm 8B of the second fencing device 4; and a second coupler 18B joins a third arm from the first fencing device 2 with a fourth arm 8D of the second fencing device 4. The tubular coupler 18 may be or comprise a length hose, such as a length of fuel line or vacuum tubing, such as a fuel line conforming to the J30 or J30R7 fuel and oil hoses standard as published by the Society of Automotive Engineers of Warrendale, Pa., or other suitable tubing, hose or material known in the art.

A plurality of rods 20 are positioned to be in contact with the ground surface 12 and are each held in place by one or more garden staples 22. The combination of rods 20 and garden staples 22 further pull the fencing material 16 downward to the ground surface 12. The combination of rods 20 and garden staples 22 are positioned along a ground side 16A of the barrier material 16. In one exemplary preferred embodiment of the present invention, one or more of rods 20 may comprise a flexible linear length of steel, aluminum or iron rebar having a nominal diameter in the range from 0.250 inch 0.375 inch.

A rigid top wire 24 extending from the top positioned tubular coupler 18A extends away from the ground surface 12 and away from a top side 16B of the barrier material 16. The rigid top wire 24 maintains a flag 26 distally from the ground surface 12. The top wire 24 may be or comprise a plastic polymer, iron, steel, aluminum or copper or other suitable material known in the art, and is preferably sized as within the range of Wire Number One to Ten, i.e., the range of American Wire Gage from 0.289 inches to 0.102 inches.

The flag 26 is a visual element that discourages certain animals, such as deer, from attempting to jump the barrier material 16. The flag may be or comprise organic, or inorganic, or plastic fabric or other suitable material known in the art, and preferably has a surface area exceeding six square inches and may be colored red, yellow or other color.

The barrier material 16 is preferably positioned to vertically extend more than 6 feet above the ground surface 12 and most preferably to extend for 7 feet or higher above the ground surface 12 to discourage deer and other animals from attempting to breach or jump over the barrier material 16. The barrier material 16 may be or comprise cellulose, plastic polymer, natural or synthetic cloth, textile fabric, synthetic fiber fabric, natural fiber fabric, polyethylene, biodegradable plastic, or other suitable material known in the art. The netting 17 is permeable to air flow and may be or comprise one or more sheets of polyethylene mesh, trellis netting, Ross Deer Netting™ deer netting material, a sheet of Wild Life Netting™, Burpee Garden™ trellis netting marketed by W. Atlee Burpee & Co. of Warminster, Pa., or other suitable netting known in the art.

Referring now to FIG. 2, FIG. 2 is an illustration of the netting 17 attached to and supported by the fencing devices 2 and 4 of FIG. 1 wherein the rods 20 have not been deployed and the netting 17 is secured directly by the plurality of staples 22 along the ground side 17A of the netting 17.

Figure 3:
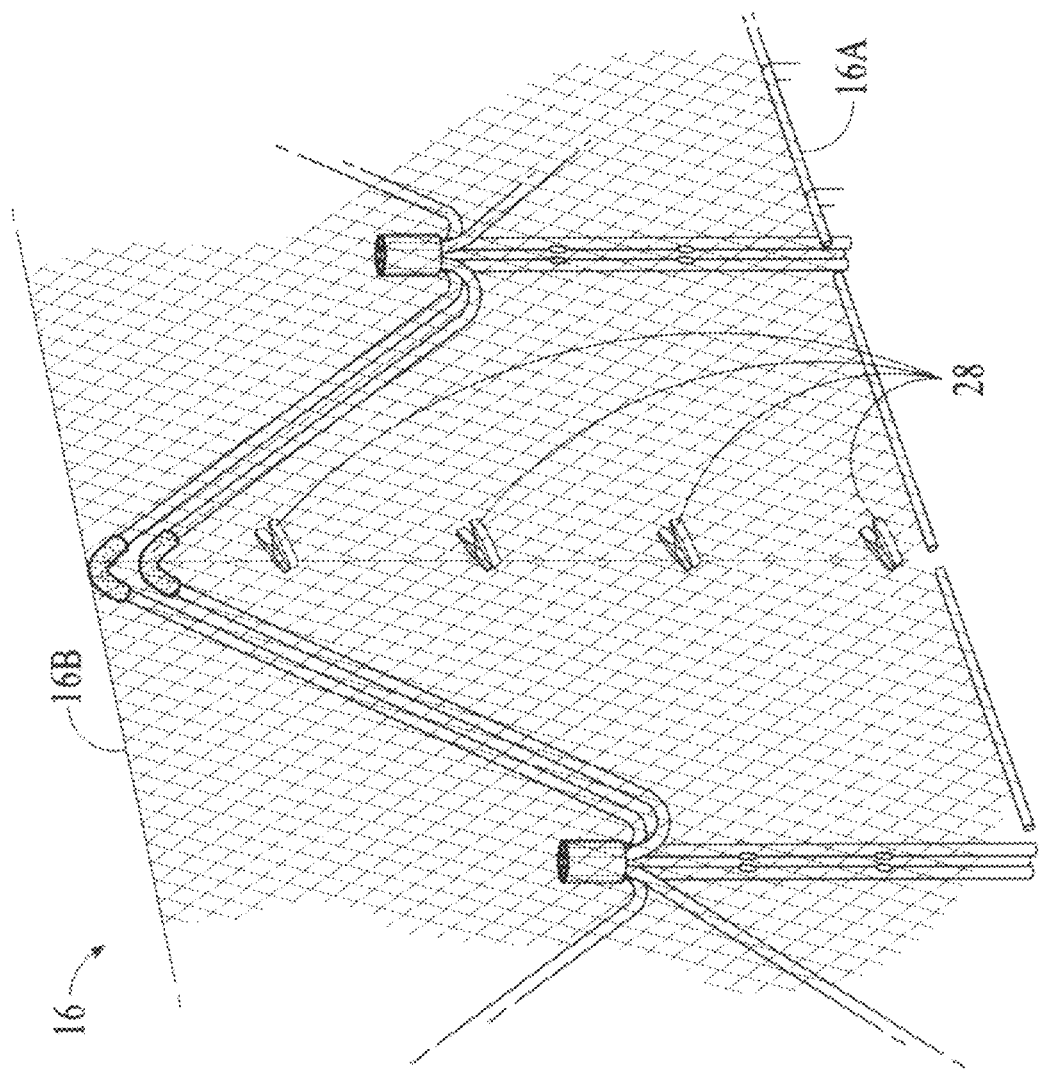
FIG. 3 is an illustration of the plurality of fencing devices of FIGS. 1 and 2 holding the barrier material in place, wherein the barrier material includes a vertical slit.

Referring now to FIG. 3, FIG. 3 is an illustration of the barrier material 16 having a vertical barrier slit 16C that extends to the ground side 16A of the barrier material 16 and optionally to the top side 16B. The barrier slit 16C is maintained in a closed positioned by a plurality of spring loaded clips 28.

Figure 4:
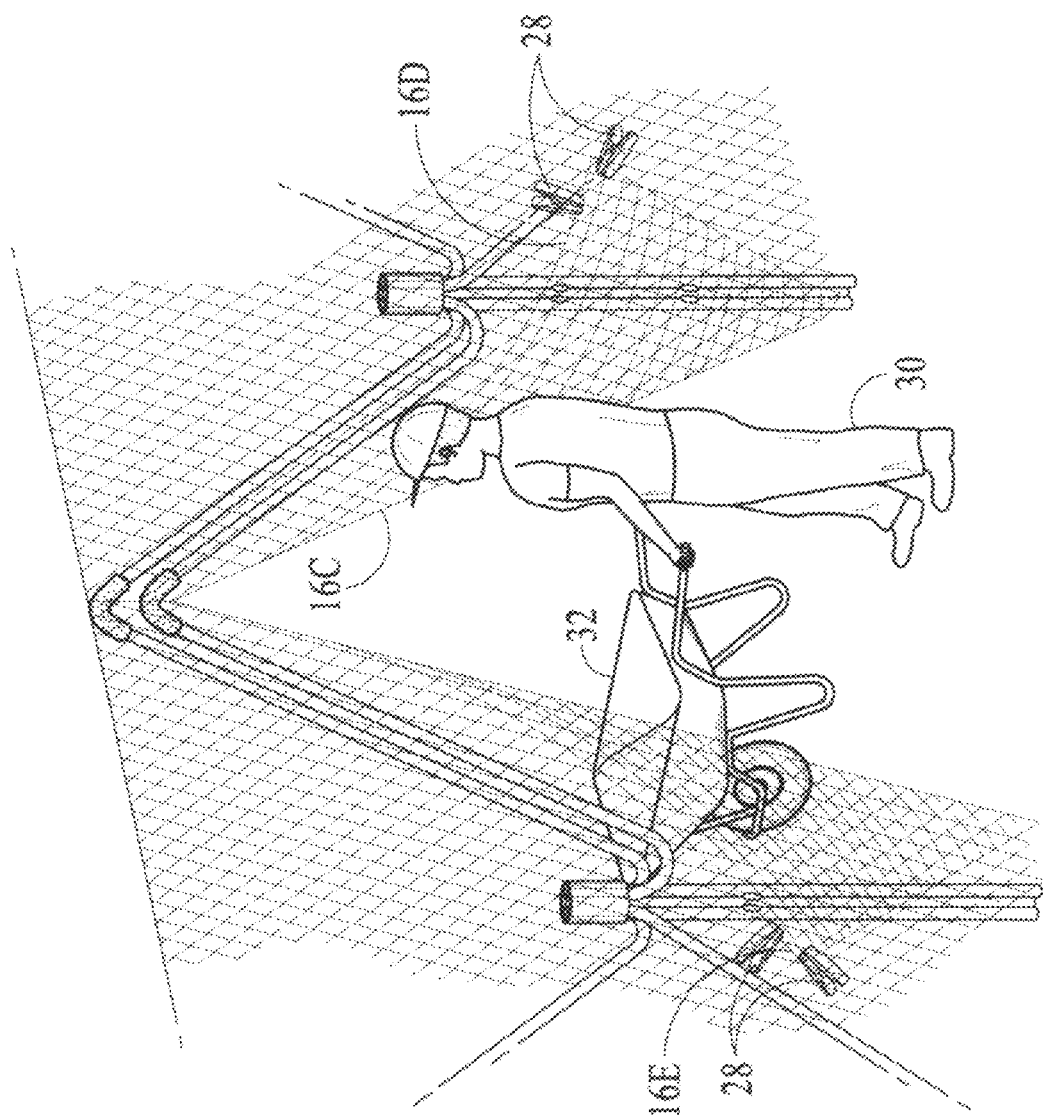
FIG. 4 is an illustration of the holding the barrier material of FIG. 3, wherein a vertical slit is maintained in an open position.

Referring now to FIG. 4, FIG. 4 is an illustration of the vertical barrier slit 16C configured in an open position. The plurality of spring loaded clips 28 maintains a first vertical side 16D of the barrier material 16 and a second vertical side 16E of the barrier material 16 in compression against the barrier material 16 to maintain the vertical barrier slit 16C in the open position. A worker 30 may pass through barrier material 16 when the vertical barrier slit 16C is maintained in the open position. The worker 30 may additional carry equipment through the vertical barrier slit 16C when configured in the open position, as well as push wheeled vehicle through the vertical barrier slit, such as a wheelbarrow 32.

Figure 5:
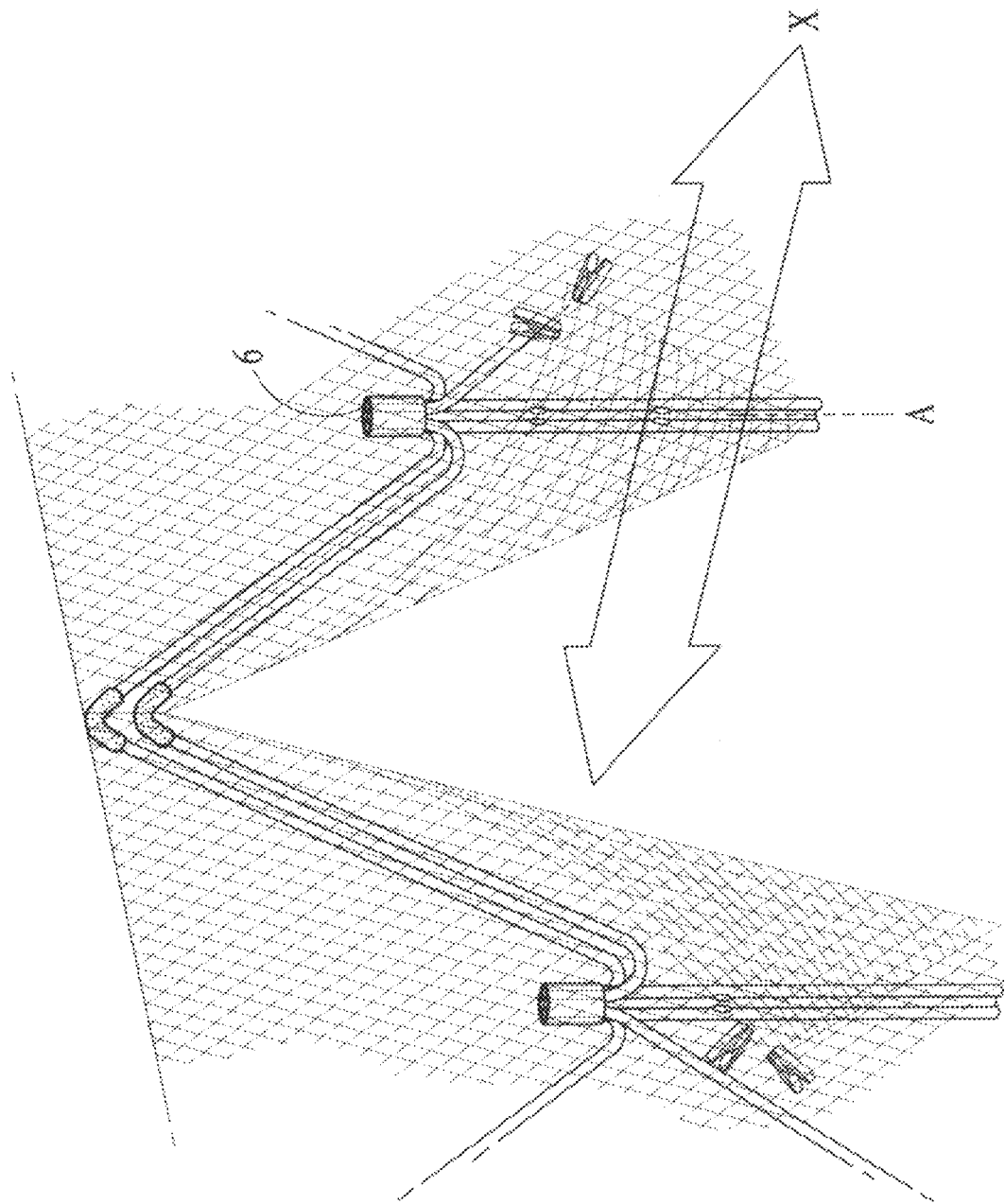
FIG. 5 is an illustration of the holding the barrier material of FIG. 3 and FIG. 4, wherein an axis of movement X is presented.

Referring now to FIG. 5, FIG. 5 illustrates an axis of movement X that is parallel to the ground surface 12 and is normal to the central elongate axis A of the rigid posts 6. The worker 30 may pass along the axis of movement X when passing through the barrier material 16 when the vertical barrier slit 16C when configured in the open position of FIG. 4.

Figure 6:
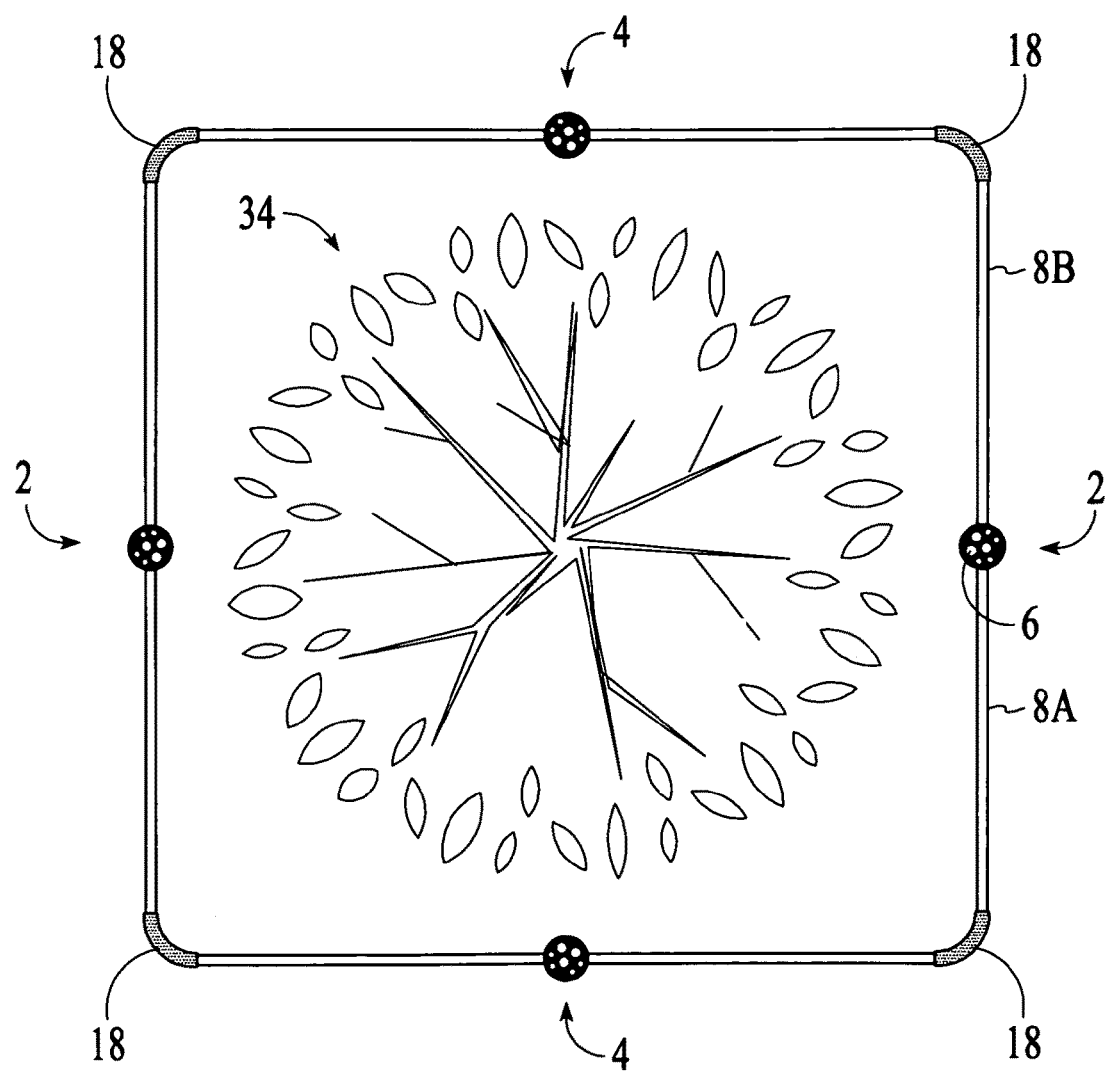
FIG. 6 is a top view of a plurality of fencing devices of FIG. 1 through 5, wherein the fencing devices are positioned and coupled to surround a tree.

Referring now generally to the Figures and particularly to FIG. 6, FIG. 6 is a top view of a plurality of fencing devices 2 and 4 wherein the fencing devices 2 are positioned and coupled to surround a tree 34, or other plants or seedlings. Four rigid posts 6 are partially driven into the ground surface 12 and each flexible arm 8A-8D is coupled to a flexible arm 8A-8D of a neighboring fencing device 2 by insertion into tubular couplers 18.

Figure 7:
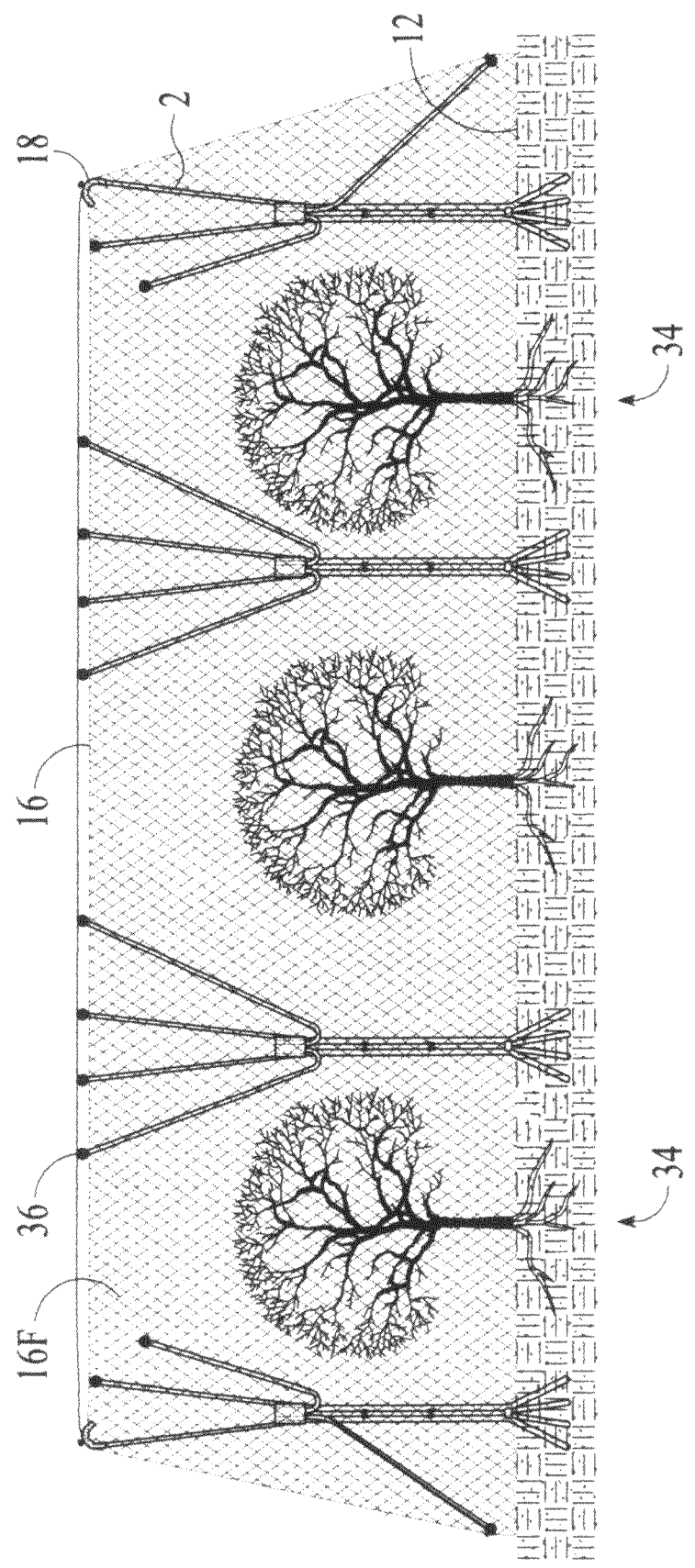
FIG. 7 is a side view of a plurality of fencing devices of FIG. 1 through 6 configured to support the barrier material to encircle around and provide cover over a plurality of trees, or other plants or seedlings.
Figure 8:
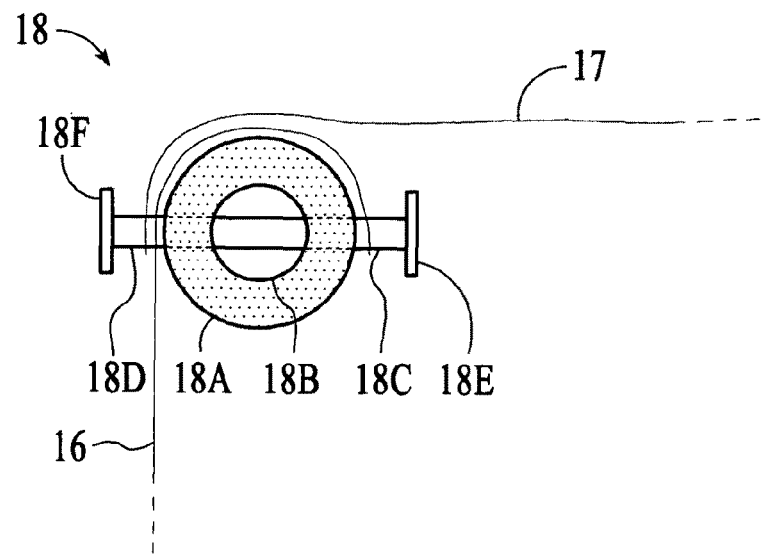
FIG. 8 is a side view of the tubular coupler of FIGS. 1 through 7.
Figure 16:
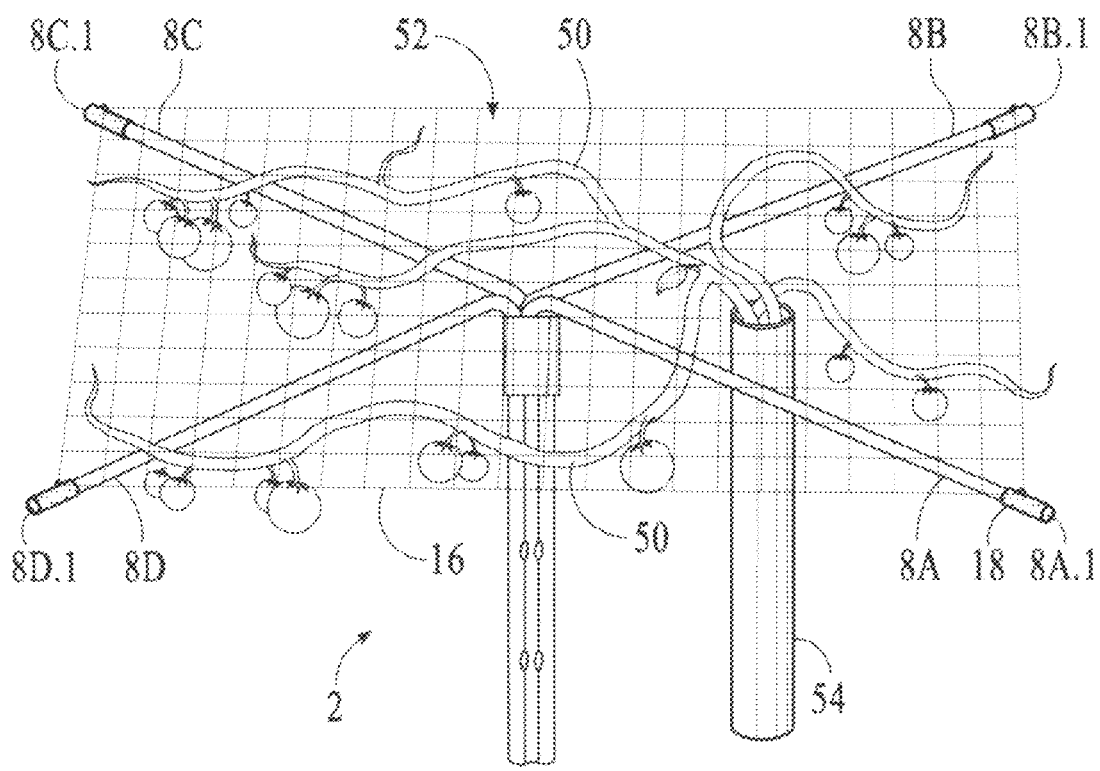
FIG. 16 is a perspective side view of the fencing device of FIG. 1 through FIG. 7, FIG. 10, FIG. 11 and FIG. 15, wherein the flexible arms are positioned to orient the barrier material in a horizontal position to support elements of a tomato plant.

Referring now generally to the Figures and, particularly to FIG. 7, FIG. 7 is a side view of a plurality of fencing devices 2 configured to support the barrier material 16 to encircle around and provide cover over a plurality of trees 34, or other plants or seedlings. Selected flexible arms 8A-8D are each fitted with a spherical ball 36 and are positioned to extend both away from the collar 10 and substantively vertically upward and away from the ground surface 12. A plurality of tubular couplers 18 are used to couple the remaining flexible arms 8A-8D together as shown in FIGS. 1 through 6. The spherical balls 36 may be balls of Styrofoam™, or other suitable material known in the art, into which a distal end 8A.1-8D.1 (as indicated in FIG. 16) of the selected flexible arms 8A-8D are pressed into. The spherical balls 36 preferably having a diameter equal to or greater than twice the size of the openings 16F of the barrier material 16. Alternatively, the spherical balls 36 may be objects that present a surface are to the barrier material 16 that is preferably equal to or greater than twice the size of the openings 16F of the barrier material 16. FIG. 8 is a side view of the tubular coupler of FIGS. 1 through 7.

FIG. 8 is a side view of the tubular coupler 18 includes a coupler body 18A that may be formed of organic or synthetic rubber. The coupler body 18A is sized to accept a flexible arm 8A-8D within an internal channel 18B formed within and by the coupler body 18A. The internal channel 18B may have an internal diameter of less than 0.25 inches and is configured to form a friction fit with a distal end of one or two flexible arms 8A-8D. The tubular coupler 18 further comprises double headed pin 18C having a pin shaft 18D that extends through the coupler body 18A and presents a pair of heads 18E and 18F useful to capture the barrier material 16 and the netting 17.

Figure 9:
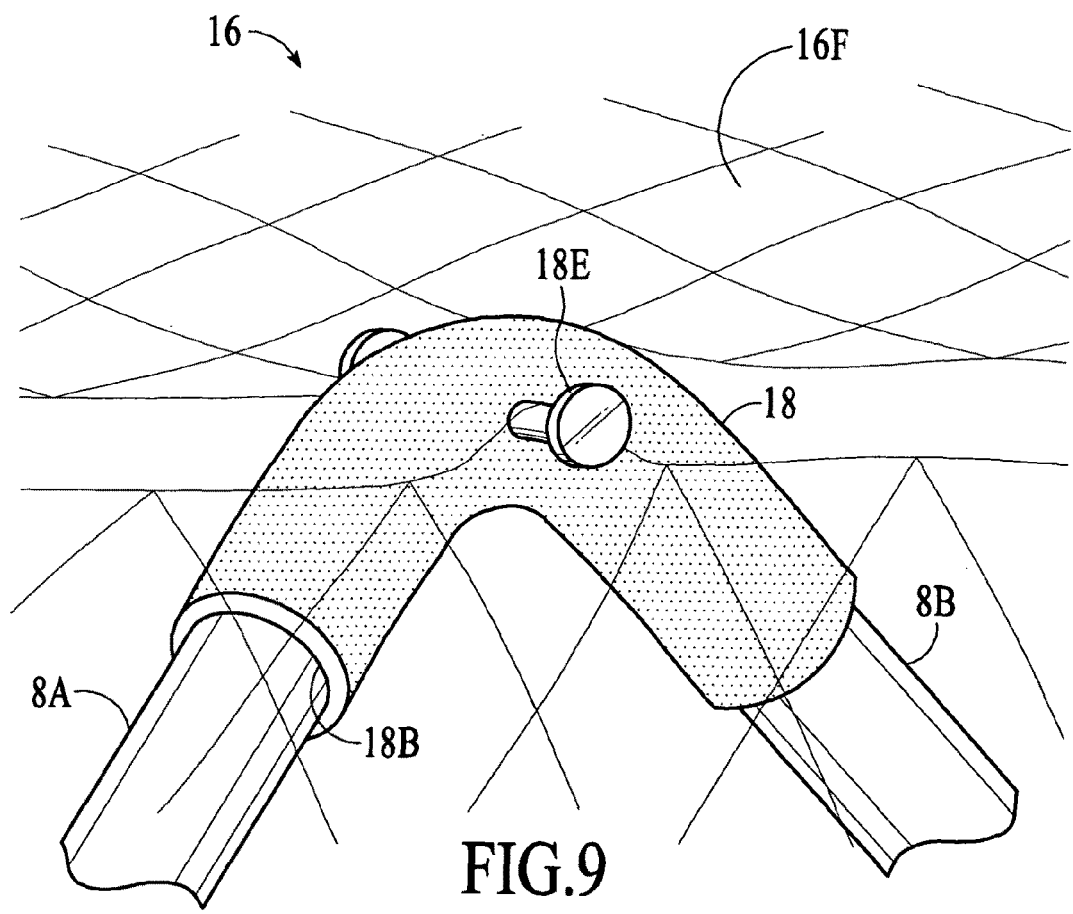
FIG. 9 is a perspective view of the tubular coupler of FIGS. 1 through 8.

FIG. 9 is a perspective view of the tubular coupler 18 forming a friction fit with both the first flexible arm 8A of the first fencing device 2 and the second flexible arm 8B of the second fencing device 4 by insertion of both pictured flexible arms 8A and 8B into the inner channel 18B of the tubular coupler 18.

Figure 10:
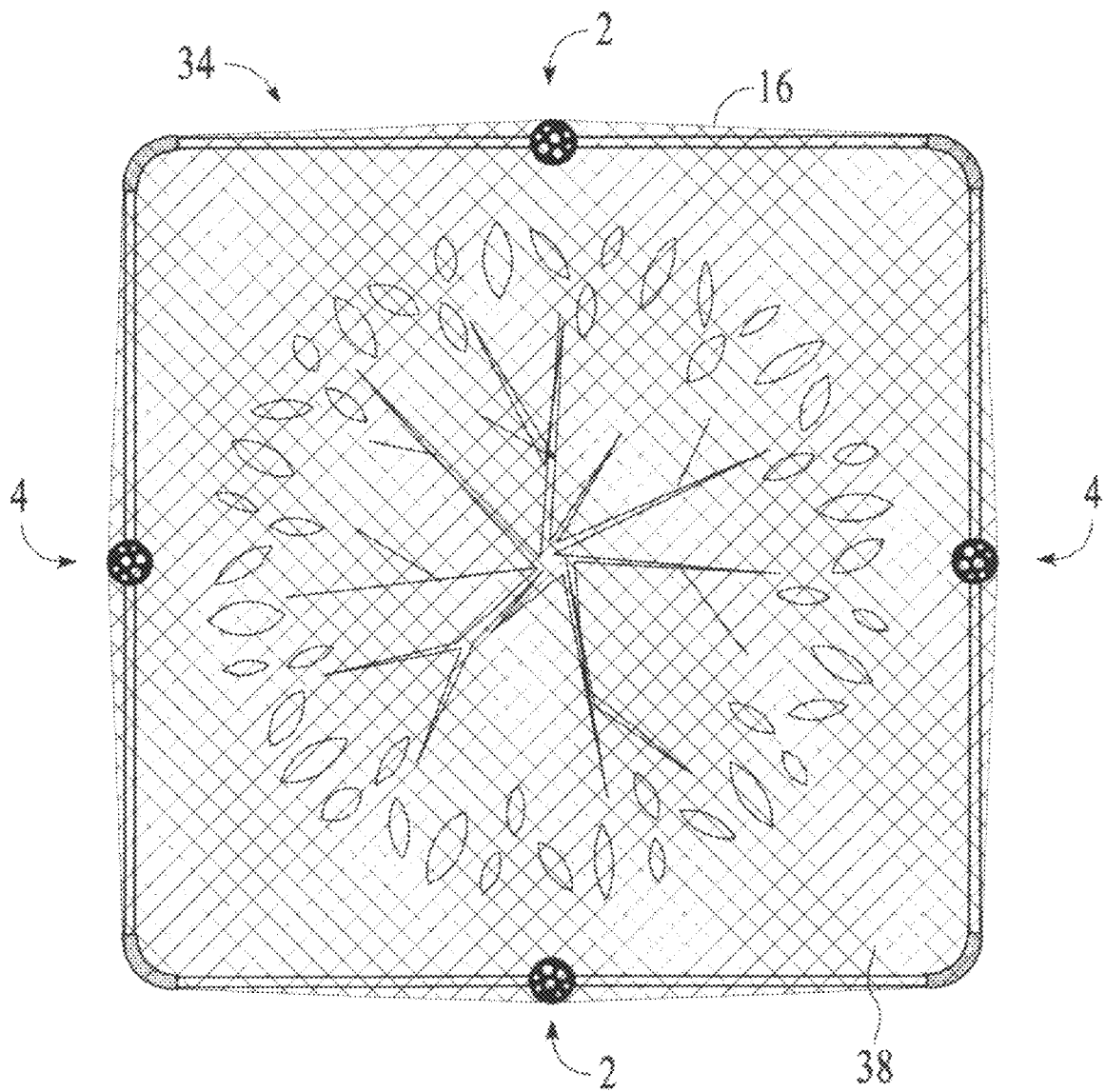
FIG. 10 is a top view of a plurality of fencing devices of FIG. 1 through 7, wherein the fencing devices are positioned and coupled to both encircle a tree and to provide top cover over the tree.

FIG. 10 is a top view of a plurality of fencing devices 2, wherein the fencing devices 2 are positioned and coupled to both encircle the tree 34 and additionally to provide top cover over the tree 34 with an additional sheet 38 of barrier material. The additional sheet of barrier material 38 may be one or more sheets of material that comprise cellulose, plastic polymer, natural or synthetic cloth, textile fabric, synthetic fiber fabric, natural fiber fabric, polyethylene, biodegradable plastic, polyethylene mesh, trellis netting, Ross Deer Netting™ deer netting material, a sheet of Wild Life Netting™, Burpee Garden™ trellis netting marketed by W. Atlee Burpee & Co. of Warminster, Pa., or other suitable material known in the art.

Figure 11:
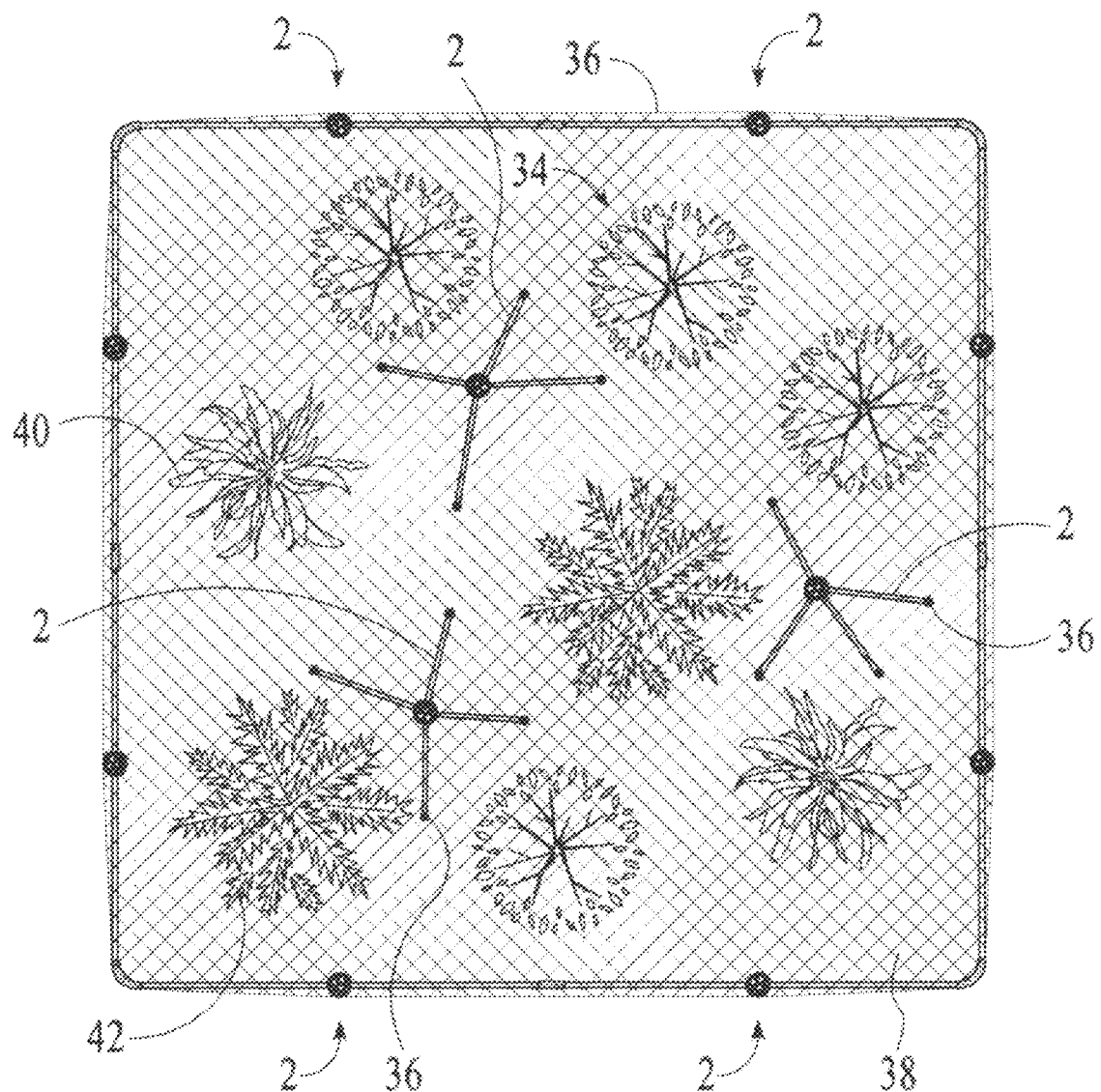
FIG. 11 is a top view of a plurality of fencing devices of FIG. 1 through 7 and 10, wherein the fencing devices are positioned and coupled to both encircle a plurality of plants and to provide top cover over the plurality of plants.

FIG. 11 is a top view of a plurality of fencing devices 2 positioned and coupled to both encircle a plurality of plants 34, 40 and 42 and to provide top cover over the plurality of plants 34, 40 and 42. Three fencing devices 2 are located internally within a area defined and encompassed by eight border fencing devices 4 that surround the plurality of plants 34, 40 and 42. The internally located devices 2 are fitted with Styrofoam™ polystyrene foam balls 36 (as marketed by Dow Chemical Company of Midland, Mich.) at the distal ends of flexible arms 8A-8D and support the additional sheet 38 of barrier material to provide top cover to the plurality of plants 34, 40 and 42. The additional sheet 38 of barrier material may protect the plurality of plants 34, 40 and 42 from damage caused by birds.

FIG. 12 is a side view of an alternate coupler configuration 44 of the tubular coupler 18. The alternate coupler 44 includes the coupler body 18A and a pin 45 that pierces a side of the coupler body 18A while exposing the head 18E. The head 18E attached to the pin 45 is exposed to enable a line 46 to be wrapped around the pin 45.

FIG. 13 is a perspective view of an alternate configuration of the fencing devices 2 and barrier material 16, wherein the barrier material 16 is reduced in height to extend from the ground surface 12 to the collar 10. A latch 47 extends from each collar 10 to capture and support the barrier material 16. The barrier material 16 is further captured by the plurality of tubular couplers 18 that are attached to the distal ends 8C.1 and 8D.1 of the third and fourth flexible arms 8B and 8D. A plurality of lines 46 extend horizontally along a plurality of alternate couplers 44 positioned along the first and second flexible arms 8A and 8B. A top line 48 extends horizontally along a plurality of tubular couplers 18 positioned along the distal ends 8A.1 and 8B.1 of the first and second flexible arms 8A and 8B.

Figure 14:
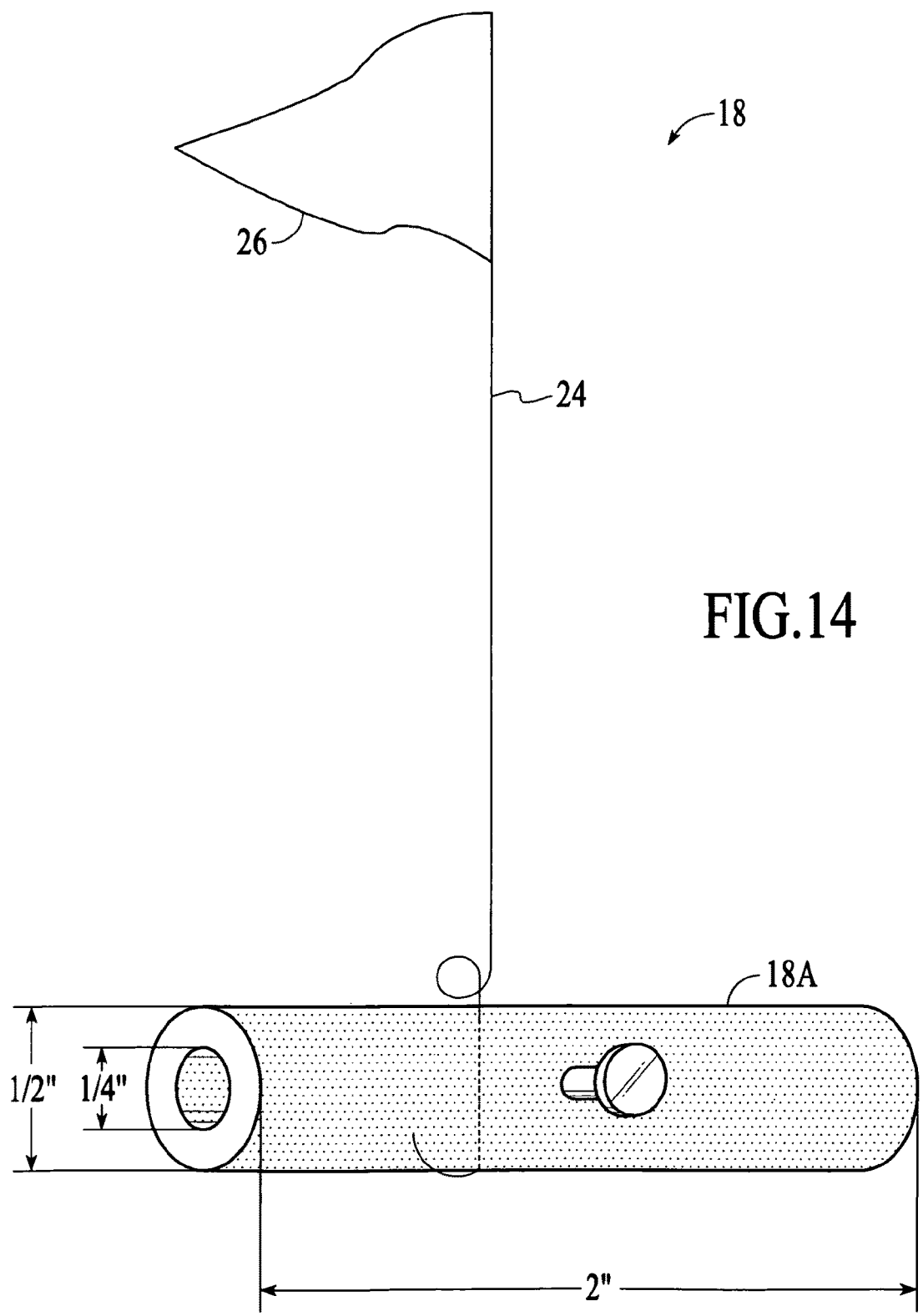
FIG. 14 is a side perspective view of the tubular coupler of FIG. 8 and FIG. 9.

FIG. 14 is a side perspective view of the tubular coupler 18. The rigid top wire 24 maintains pierces the tubular coupler body 18A and preferably maintains the flag 26 at a distance of from 3 inches to two feet away from the tubular coupler 18. The inner channel 18B has a cross-sectional diameter of 0.25 inches and the tubular body 18A forms a cross-sectional outer diameter of 0.5 inches of is composed of a hollowed flexible material having a thickness of 0.25 inch. The tubular coupler 18 has a linear length of 2.0 inches.

Figure 15:
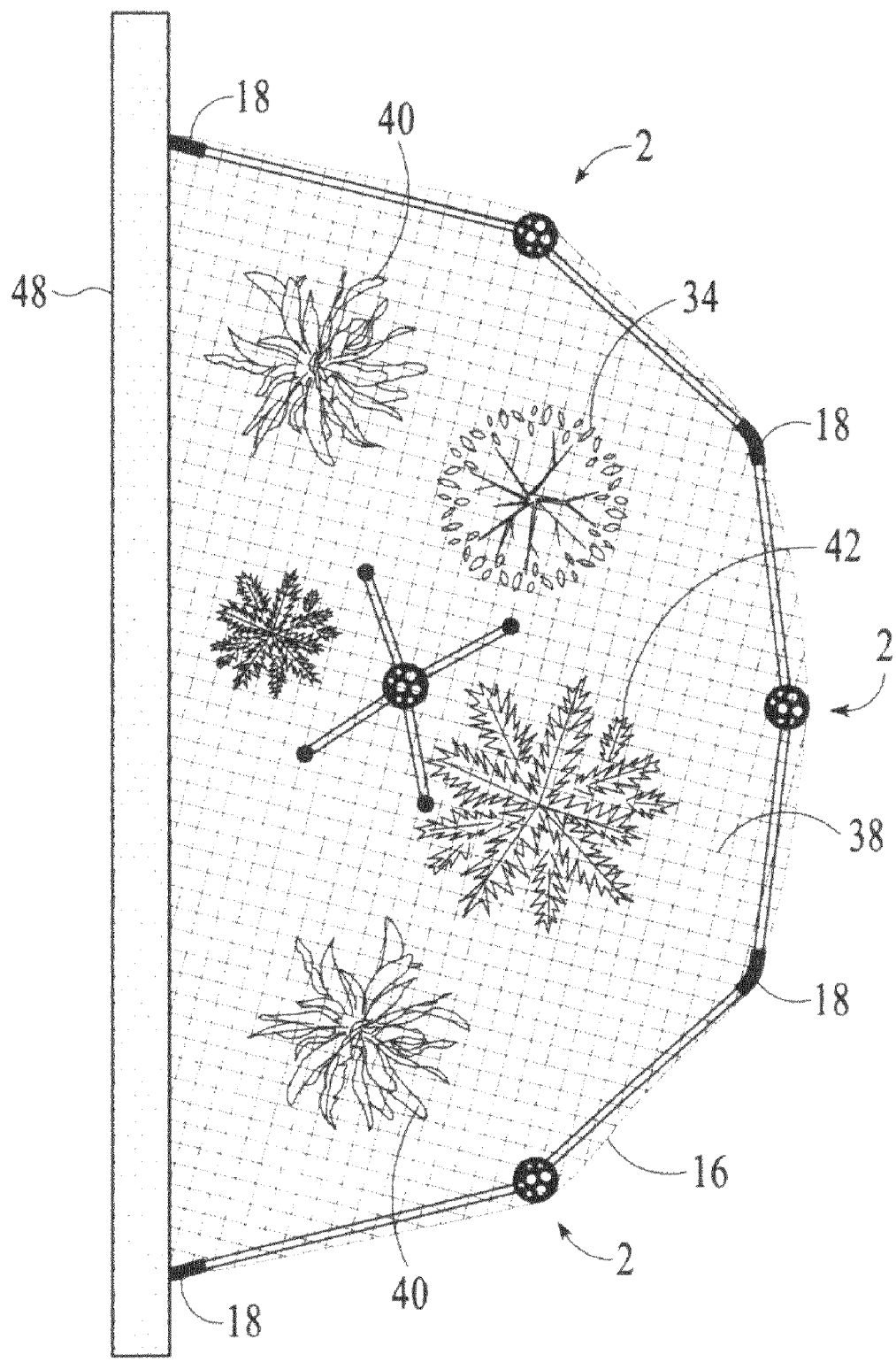
FIG. 15 is a top view of a plurality of fencing devices of FIG. 1 through FIG. 7, FIG. 10 and FIG. 11, wherein the fencing devices are positioned and coupled to both encircle a plurality of plants in combination with a wall and to also provide top cover over the plurality of plants.

FIG. 15 is a top view of a plurality of fencing devices 2, wherein the fencing devices 2 are positioned and coupled to both encircle a plurality of plants 34, 40 and 42 in combination with a wall 48 and to also provide top cover by means of the additional sheet 38 of barrier material 16 over the plurality of plants 34, 40 and 42.

FIG. 16 is a perspective side view of the fencing device 2 of wherein the flexible arms 8A-8D are positioned to orient the barrier material 16 in a horizontal position to support plant elements 50 of a tomato plant 52. A protective tube 54 guides the tomato plant 52 up from the ground surface 12 to extend through above and onto the barrier material 16. The barrier material 16 is captured by the coupler pins 18C of the plurality of tubular couplers 18 that are attached to the plurality of flexible arms 8A-8D at the distal ends 8A.1-8D.1

Figure 17:
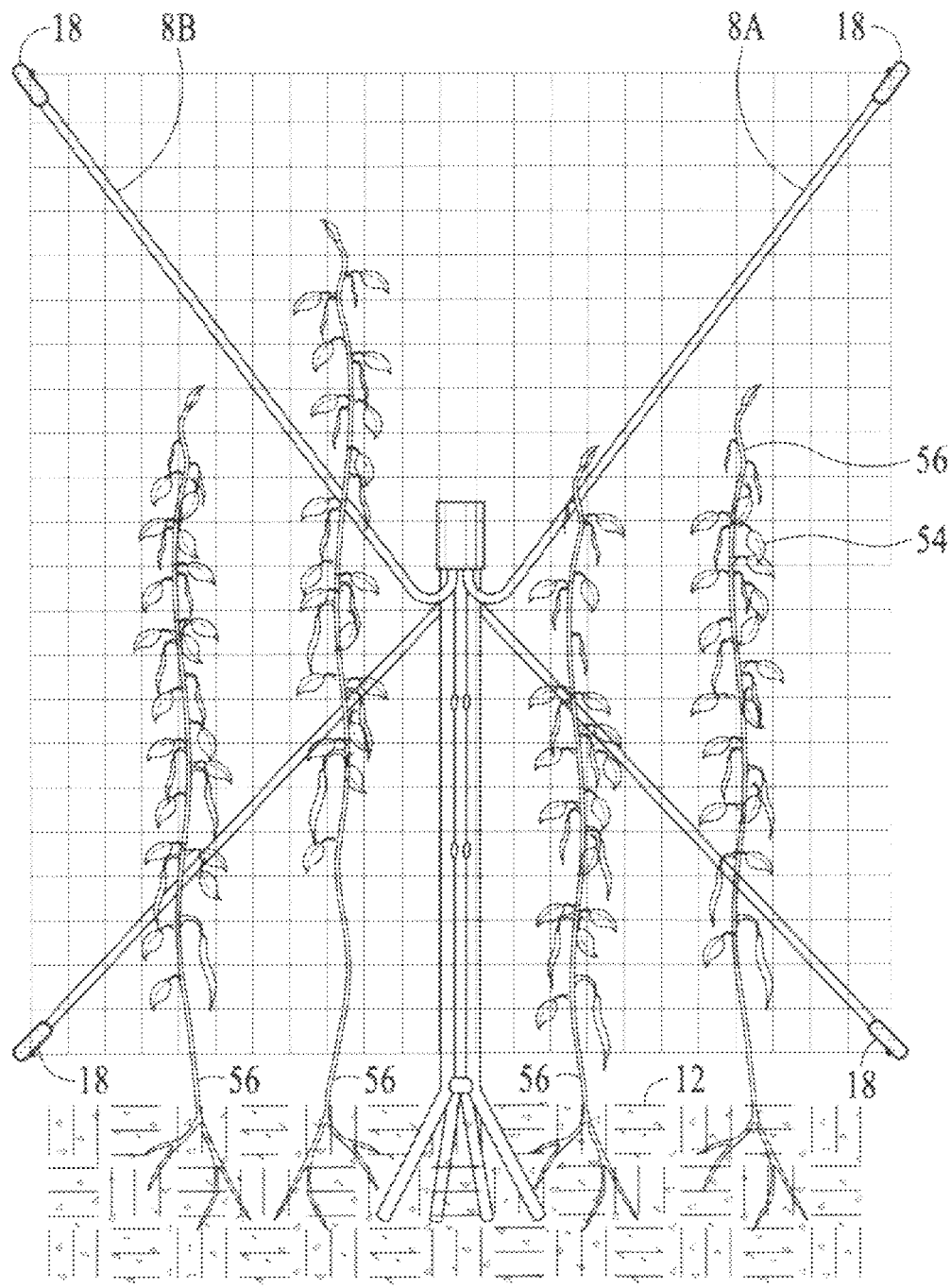
FIG. 17 is a cut-away side view of the fencing device of FIG. 1 through FIG. 7, FIG. 10, FIG. 11, FIG. 15 and FIG. 16, wherein the flexible arms are positioned to orient the barrier material in a vertical orientation to support elements of a vine.

FIG. 17 is a cut-away side view of the fencing device 2, wherein the flexible arms 8A-8D are positioned to orient the barrier material 16 in a vertical orientation to support vine elements 54 of a plurality of vines 56.

Figure 18:
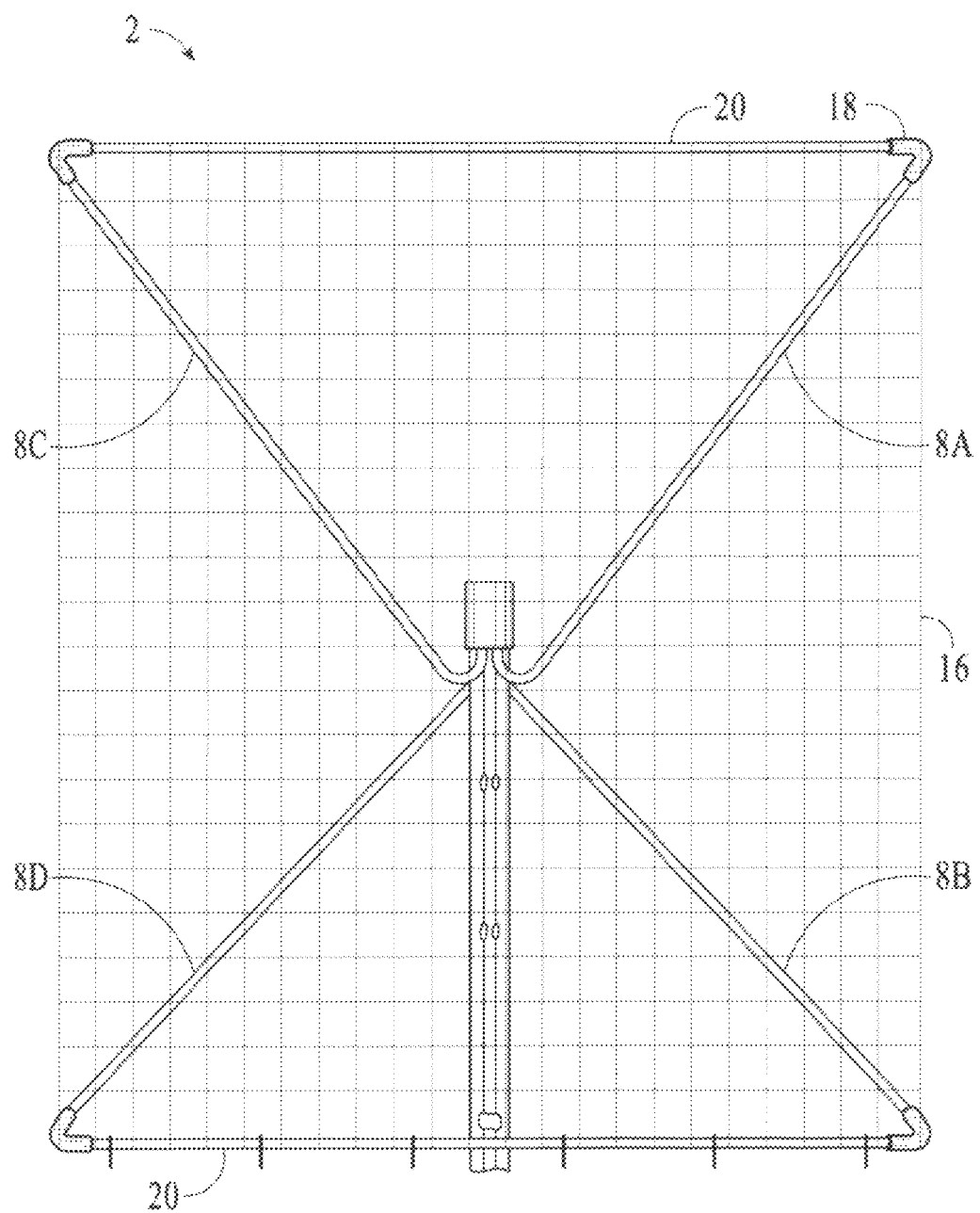
FIG. 18 is a front view of the fencing device of FIG. 1 through FIG. 7, FIG. 10, FIG. 11, and FIG. 15 through FIG. 17, wherein the flexible arms are positioned to orient the barrier material in a vertical orientation and coupled to rods of FIG. 1 to provide additional tension to the barrier material.

FIG. 18 is a front view of the fencing device 2, wherein the flexible arms 8A-8D are positioned to orient the barrier material 16 in a vertical orientation and coupled to rods 20 to provide additional tension to the barrier material 16. Each of the two rods 20 is coupled to two flexible arms 8A-8C by means of tubular couplers 18.

FIG. 19 is a perspective side view of the fencing device 2 wherein the flexible arms 8A-8D are positioned to orient a shading material 58 in a horizontal position to protect sun-sensitive plants 60 from the sun 62 or exposure to inclement weather 64. The shading material 58 may be or comprise cellulose, plastic polymer, natural or synthetic cloth, textile fabric, synthetic fiber fabric, natural fiber fabric, polyethylene, biodegradable plastic, or other suitable material known in the art.

Figure 20:
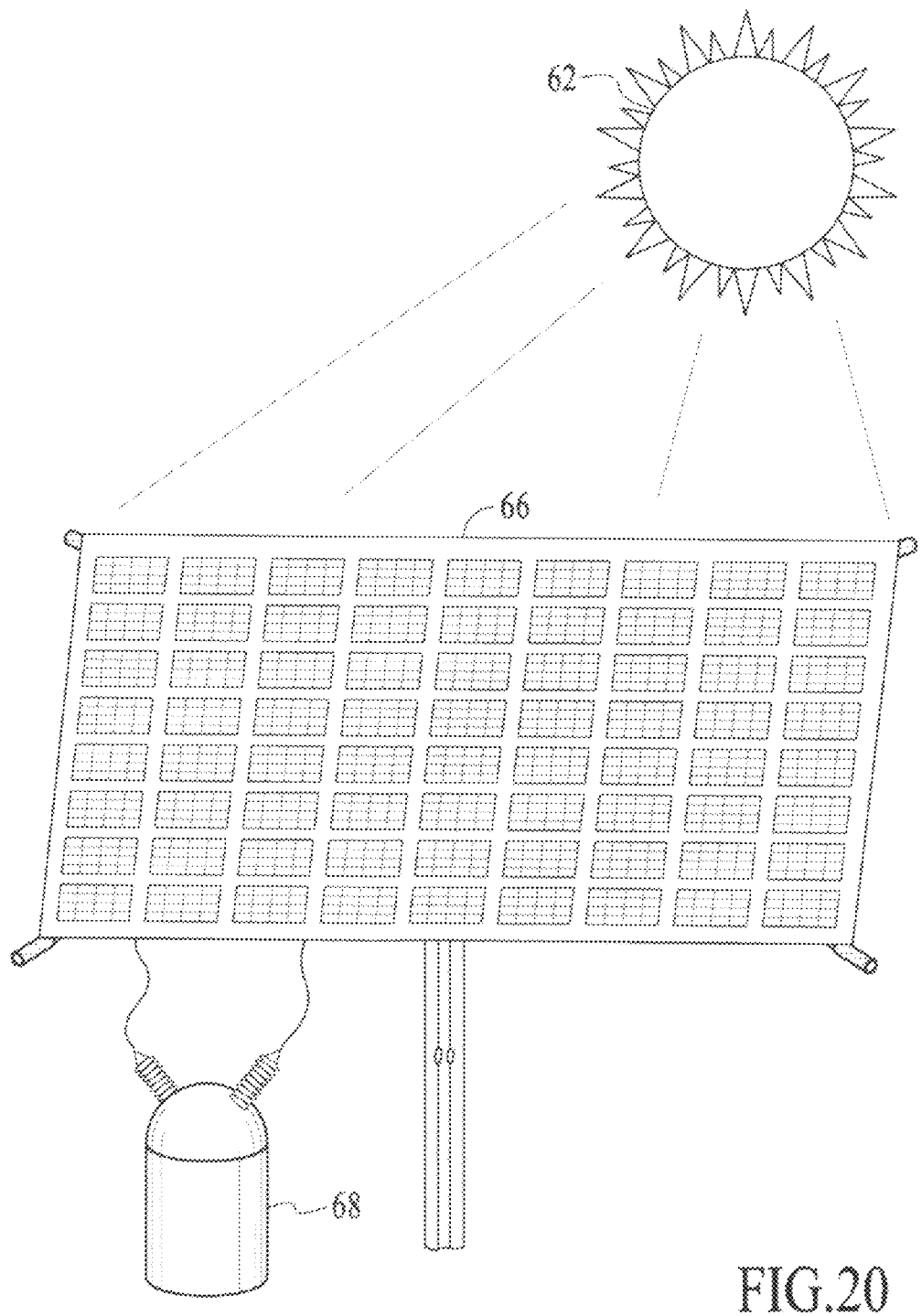
FIG. 20 is a perspective side view of the fencing device of FIG. 1 through FIG. 7, FIG. 10, FIG. 11, and FIG. 15 through FIG. 19, wherein the flexible arms are positioned to orient a solar energy collection panel or other material in a horizontal position and facing the sun.

FIG. 20 is a perspective side view of the fencing device 2, wherein the flexible arms 8A-8D are positioned to orient a solar energy collection panel 66 in a horizontal position and facing the sun 62. The solar energy collection panel 66 may be or comprise a thin film solar panel marketed by Nanosolar Corporation of San Jose, Calif. or a thin film solar panel marketed by First Solar Corporation of Tempe, Ariz. The plurality of pins 18C of the couplers 18 secures the solar energy collection panel 66 to the fencing device 2. A battery 68 is electrically coupled to the solar energy collection panel 66 and receives electrical energy from the solar energy collection panel 66 for storage and later use.

Figure 21:
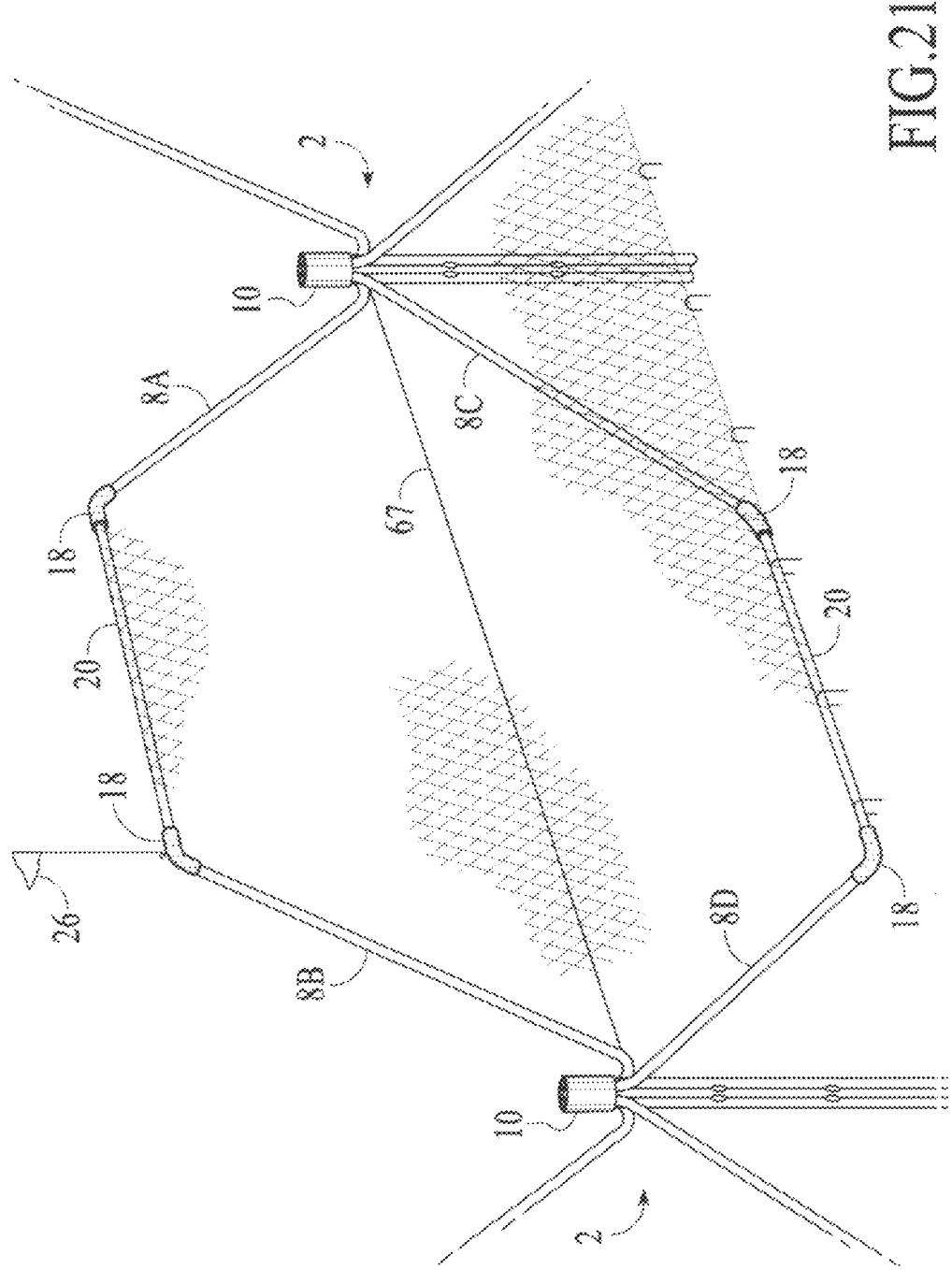
FIG. 21 is an illustration of the plurality of fencing devices of FIG. 2 holding the barrier material in place, wherein the rods of FIG. 1 are coupled with flexible arms of the fencing devices and a support line is added to provide support to the barrier material.

FIG. 21 is an illustration of the plurality of fencing devices 2 holding the barrier material 16 in place, wherein the rods 20 are coupled with flexible arms 8A-8D of the fencing devices 2 and a support line 70 is added to provide support to the barrier material 16. The support line 70 may be wrapped around or below the collars 10 to be secured to the fencing devices 2. The rods 20 may present a linear length with plus or minus 5% or closer tolerance to a common linear length of the flexible arms 8A-8D, wherein the two rods 20 and the flexible arms 8A-8D form a hexagon of approximately equal sides within a plus or minus 5% tolerance or linear length deviation, or a lower deviation. The rods 20 are each coupled to a different pair of flexible arms 8A-8D by friction fit into a pair of tubular couplers 18.

Figure 22:
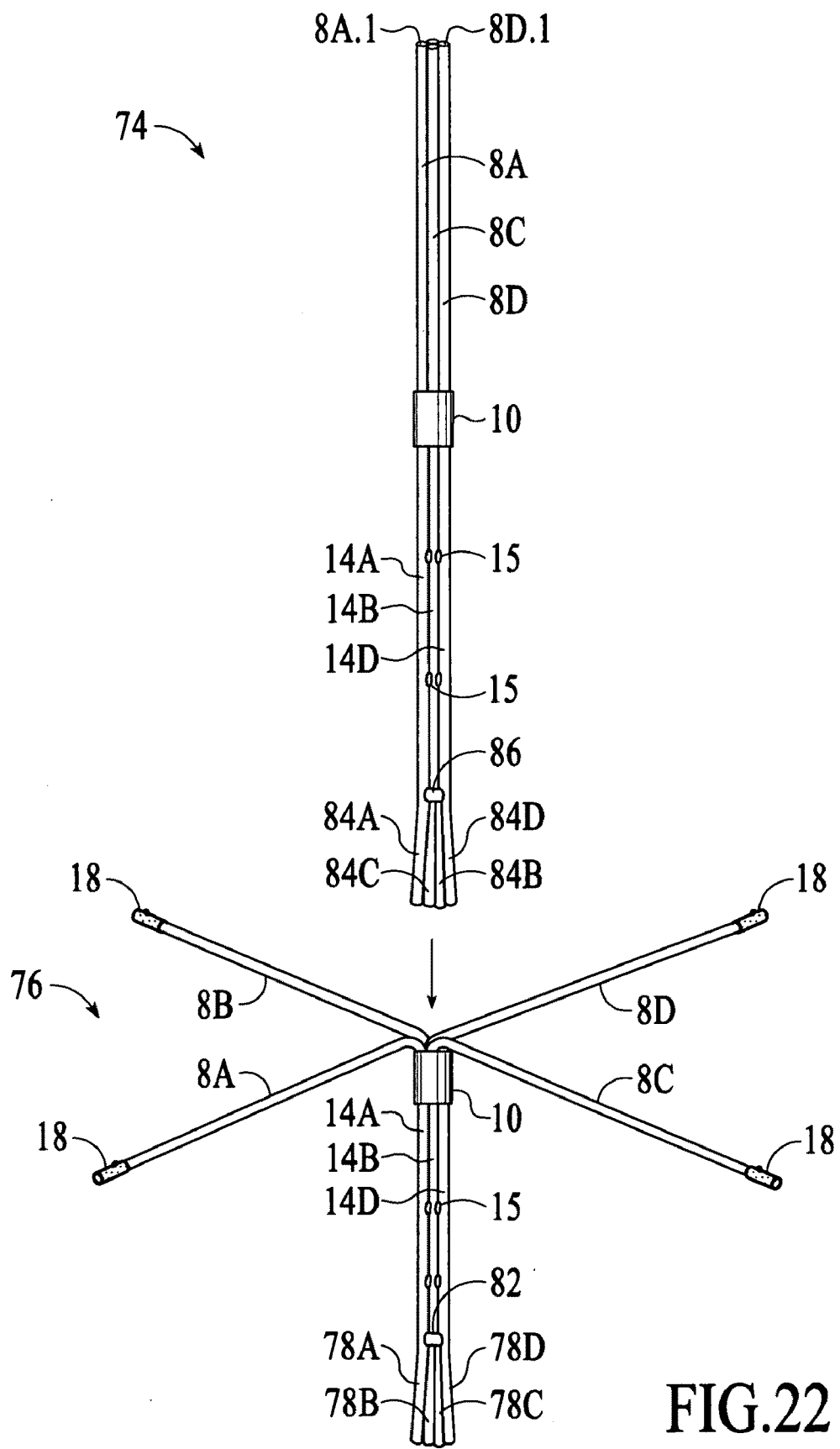
FIG. 22 is a perspective side view of two substantially identical trellis devices of wherein a first trellis device is shown in a shipping configuration and a second trellis device is shown in a deployed configuration.

FIG. 22 is a perspective side view of two substantially identical frameworks 74 and 76, or "trellis devices" 74 and 76, wherein the first trellis device 74 is shown in a shipping configuration and the second trellis device 76 is shown in a deployed configuration with the flexible arms 8A-8D formed to support a substantively horizontal plane.

Figure 23:
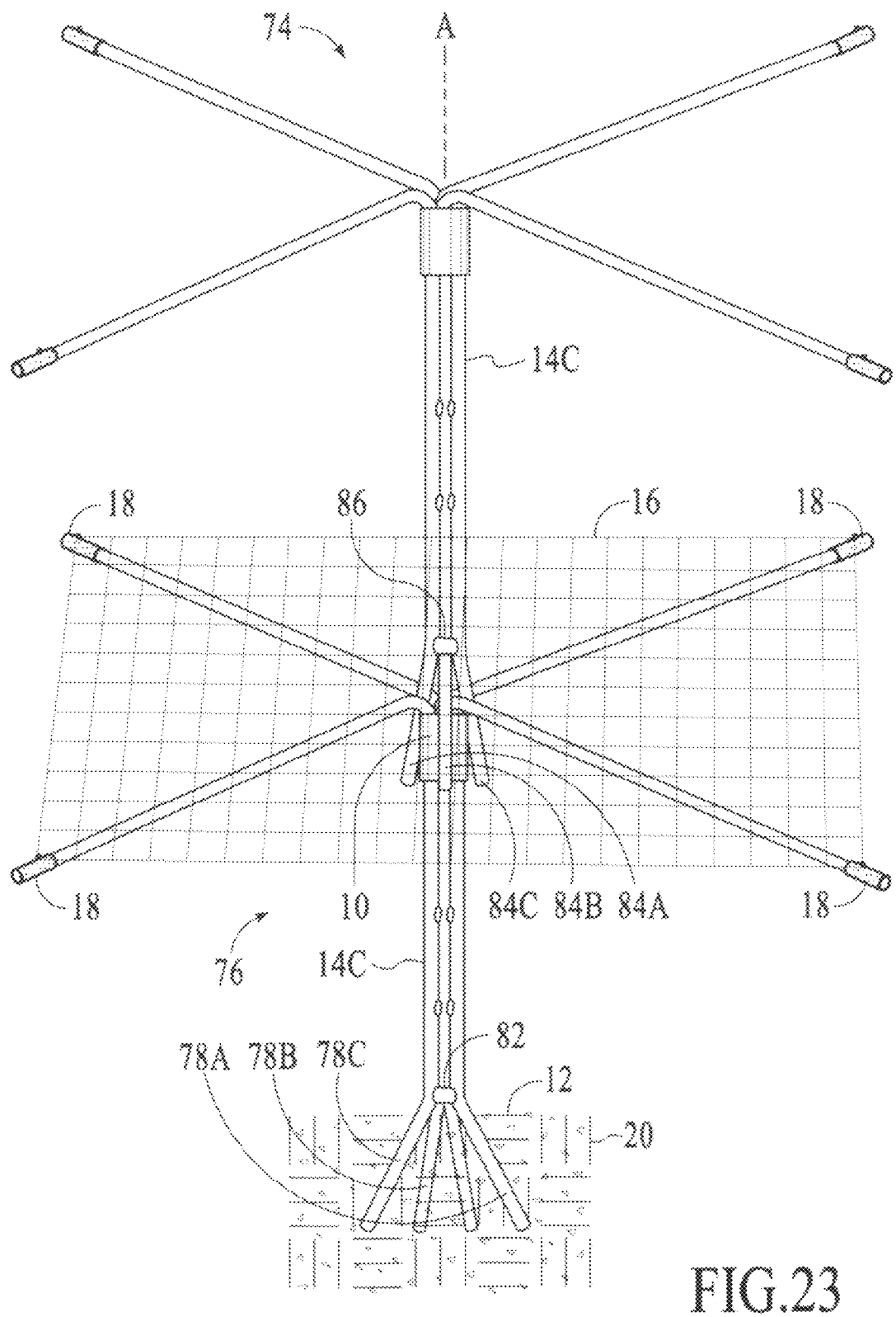
FIG. 23 is a perspective side view of the two substantially identical trellis devices of FIG. 22 wherein the first trellis device is coupled with the second trellis device.

FIG. 23 is a perspective side view of the two substantively identical and interchangeable trellis devices 74 and 76, wherein the first trellis device 74 is coupled with the second trellis device 76 in the illustrated configuration. A lower plurality of tines 78A-78D of the second trellis device 76 have been forced into a resistive ground material 80 and are splayed away from the axis A as a result of the application of the downward directed force that drove the lower plurality of tines 78A-78D into the ground material 80. The lower plurality of tines 78A-78D are formed of a portion of each elongate element 14A-14D of the second trellis device 76 that extends from a lower weld 82 that is located most distally from the collar 10 of the second trellis device 76. Each of the lower plurality of tines 78A-78D extends away from both the lower weld 82 and substantively away from the collar 10 of the second trellis device 76. The plurality of elongate elements 8A-8D of the second trellis device 76 are formed into the rigid post 6 by the collar 10 and the welds 15 and 82.

A higher plurality of tines 84A-84D of the first trellis device 74 have been shaped to fit around the collar 10 and the plurality of flexible arms 8A-8D of the second trellis device 76. The higher plurality of tines 84A-84D are formed of a portion of each elongate element 14A-14D of the first trellis device 74 that extends from a higher device weld 86 that is located most distally from the collar 10 of the first trellis device 74. The plurality of elongate elements 8A-8D of the first trellis device 74 are formed into the rigid post 6 by the collar 10 and the welds 15 and 86.

Each of the higher plurality of tines 84A-84D extends from both the higher device weld 86 and substantively away from the collar 10 of the first trellis device 74.

The barrier material 16, the additional sheet 38 of barrier material, the netting 17, the solar energy collection panel 66, or the shade material 58 may be coupled to one or more flexible arms 8A-8C of the first trellis device 74 and/or the second trellis device 76.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

What is claimed is:

1. A device comprising:
   a. a rigid elongate post, the elongate post having a striking end and a ground end, and the elongate post including at least two solid cylindrical elongate elements, each elongate element having an anchor end, wherein the anchor ends in combination form the ground end, wherein the device has a first state wherein the anchor ends are substantively parallel along an elongate axis, and the device further has a second state wherein the anchor ends are splayed and angle away from the elongate axis;
   b. at least two flexible arms, each arm coupled to the elongate post at the striking end, wherein each arm is reconfigurable to extend vertically toward the ground end of the elongate post; and
   c. each arm is reconfigurable to extend vertically away from the ground end.

2. The device of claim 1, wherein the elongate post comprises rebar.

3. The device of claim 1, further comprising a third flexible arm and a fourth flexible arm coupled to the rigid elongate post and reconfigurable to extend either toward or away from the ground end of the rigid elongate post.

4. The device of claim 1, wherein each arm is reconfigurable to extend away from the striking end with a range from zero degrees to 180 degrees from an elongate axis of the elongate post.

5. The device of claim 1, wherein each arm extends for a length within the range from one foot to six feet from the striking point.

6. The device of claim 1, further comprising a netting, the netting extending vertically from at least two arms and toward the ground end of the elongate post.

7. The device of claim 1, further comprising at least three solid cylindrical tines forming the ground end of the elongate post, each tine adapted to be substantively parallel along the elongate axis when the device is in the first state, and each tine further adapted to splay away from the elongate axis when the device is in the second state.

8. The device of claim 7, further comprising a netting, the netting extending vertically from the at least two arms and to the ground end of the elongate post.

9. The device of claim 1, further comprising a collar, the collar for coupling the at least two arms and the elongate post.

10. The device of claim 9, wherein the collar, elongate post and the at least two arms comprise a weldable material, and the elongate post and the at least two arms are coupled by a weld.

11. In combination, a barrier material coupled with a plurality of devices, comprising:
   a. The barrier material extending vertically from a distal point of a plurality of arms of each device; and
   b. Each device comprising:
      i. a rigid elongate post, the elongate post having a striking end and a ground end, and the elongate post including at least two solid cylindrical elongate elements, each elongate element having an anchor end, wherein the anchor ends in combination form the ground end, wherein the device has a first state wherein the anchor ends are substantively parallel along an elongate axis, and the device further has a second state wherein the anchor ends are splayed and angle away from the elongate axis;
      ii. at least two flexible arms, each arm coupled to the elongate post at the striking end, wherein each arm is reconfigurable to extend vertically toward the ground end of the elongate post; and iii. each arm is reconfigurable to extend vertically away from the ground end and for coupling at a distal end with the barrier material.

12. The combination of claim 11, wherein the barrier material comprises a netting.

13. The combination of claim 11, wherein at least one device further comprises a third arm coupled with the elongate post, the third arm reconfigurable for coupling with the barrier material, wherein the barrier material is coupled at a first edge to the at least two arms and at a second edge to the third arm.

14. The combination of claim 13, wherein the third arm is reconfigurable to extend from the elongate post striking end toward the elongate post ground end of each comprising device.

15. The combination of claim 13, further comprising a plurality of couplers, each coupler for removable attachment to a first arm of a first device and to a second arm of a second device.

16. The combination of claim 15, wherein each coupler comprises tubing sized to be friction fitted around each of two arms of separate devices.

17. The combination of claim 15, wherein the barrier material is permeable to air flow.

18. The combination of claim 11, wherein the barrier material comprises a linear element extending along a first edge of the barrier material, the linear element for removable attachment to a plurality of arms of the plurality of devices.

19. The combination of claim 11, wherein each elongate post and each at least two arms comprise a weldable material, and each elongate post and each at least two arms of each device are coupled by a weld.

20. A device comprising:
  a. a solar energy collection panel;
  b. a rigid elongate post, the elongate post having a striking end and a ground end, and the elongate post including at least two solid cylindrical elongate elements, each elongate element having an anchor end, wherein the anchor ends in combination form the ground end, wherein the device has a first state wherein the anchor ends are substantively parallel along an elongate axis, and the device further has a second state wherein the anchor ends are splayed and angle away from the elongate axis; and
  c. at least two flexible arms, each flexible arm coupled to the elongate post at the striking end and each flexible arm coupled to the solar energy collection panel, wherein each flexible arm is manually reconfigurable to enable dynamic positioning of the solar energy collection panel to collect solar energy.

* * * * *